(12) United States Patent
Hattori et al.

(10) Patent No.: US 10,192,083 B2
(45) Date of Patent: Jan. 29, 2019

(54) ARTICLE MANAGEMENT SYSTEM AND ARTICLE MANAGEMENT METHOD

(71) Applicant: NEC Corporation, Tokyo (JP)

(72) Inventors: Wataru Hattori, Tokyo (JP); Naoki Kobayashi, Tokyo (JP); Hiroshi Fukuda, Tokyo (JP); Yusuke Takahashi, Tokyo (JP); Ryo Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 252 days.

(21) Appl. No.: 15/032,383

(22) PCT Filed: Jun. 2, 2014

(86) PCT No.: PCT/JP2014/002897
§ 371 (c)(1),
(2) Date: Apr. 27, 2016

(87) PCT Pub. No.: WO2015/068316
PCT Pub. Date: May 14, 2015

(65) Prior Publication Data
US 2016/0253534 A1     Sep. 1, 2016

(30) Foreign Application Priority Data

Nov. 11, 2013   (JP) ................................ 2013-233221

(51) Int. Cl.
*H04Q 5/22*   (2006.01)
*G06K 7/10*   (2006.01)
(Continued)

(52) U.S. Cl.
CPC ..... *G06K 7/10366* (2013.01); *G06K 7/10445* (2013.01); *G06Q 10/06* (2013.01); *G06Q 10/087* (2013.01); *G08B 13/2462* (2013.01)

(58) Field of Classification Search
CPC ........... G06K 7/10366; G06K 7/10445; G06K 19/0723; G06K 19/07722;
(Continued)

(56) References Cited

U.S. PATENT DOCUMENTS 3,872,438 A   3/1975  Cuttill et al.
7,271,724 B2  9/2007  Goyal et al.
(Continued)

FOREIGN PATENT DOCUMENTS

DE        2421559 A1    11/1974
JP     2005-038301 A     2/2005
(Continued)

OTHER PUBLICATIONS

Extended European Search Report issued by the European Patent Office for European Application No. 14859780.0 dated Jun. 21, 2017 (6 pages).
(Continued)

*Primary Examiner* — Dionne H Pendleton
(74) *Attorney, Agent, or Firm* — Wilmer Cutler Pickering Hale and Dorr LLP

(57) ABSTRACT

It is impossible to individually identify management target articles in a conventional article management system. An article management system according to the present invention includes a reader antenna that transmits and receives a radio signal; a plurality of tag sheets each including an RF tag and placed on the reader antenna; an RFID reader that reads tag information unique to the RF tag via the reader antenna; and an identification mark attached to each of management target articles and arranged between the management target articles and each tag sheet. On a surface of the identification mark that faces the tag sheets, an identification pattern for identifying the identification mark is formed of a first pattern and a second pattern having a (Continued)

dielectric constant or conductivity lower than that of the first pattern.

18 Claims, 14 Drawing Sheets

(51) Int. Cl.
  *G06Q 10/06* (2012.01)
  *G06Q 10/08* (2012.01)
  *G08B 13/24* (2006.01)
(58) Field of Classification Search
  CPC ......... G06K 19/07749; G06K 19/0776; G06K 19/07783; G06K 19/07798; G06K 2017/0045; G06Q 10/087; G06Q 10/06; G08B 13/2462; G08B 13/1427; G08B 13/2417; G08B 13/2437; G08B 21/0202; G08B 21/0236; G08B 21/0238; G08B 21/0247; G08B 21/0269; G08B 21/0275
  See application file for complete search history.

(56) References Cited

U.S. PATENT DOCUMENTS

| | | |
|---|---|---|
| 2006/0214792 A1 | 9/2006 | Goyal et al. |
| 2009/0057415 A1 | 3/2009 | Partanen et al. |
| 2009/0146793 A1* | 6/2009 | Fullerton ............ G06K 19/0723 340/10.4 |
| 2010/0019906 A1 | 1/2010 | Kushida et al. |
| 2012/0062367 A1* | 3/2012 | Warther ................. G06K 19/04 340/10.1 |
| 2012/0322380 A1* | 12/2012 | Nannarone ........ G08B 13/1427 455/41.2 |
| 2013/0225072 A1 | 8/2013 | Fuller et al. |
| 2016/0259952 A1* | 9/2016 | Van Rens ........ G06K 19/07766 |
| 2017/0132508 A1* | 5/2017 | Mullis ............. G06K 19/07798 |

FOREIGN PATENT DOCUMENTS

| | | |
|---|---|---|
| JP | 2009-051582 A | 3/2009 |
| JP | 2009-100952 A | 5/2009 |
| JP | 2010-211451 A | 9/2010 |
| JP | 5128898 B2 | 1/2013 |
| WO | WO-2006/104587 A2 | 10/2006 |
| WO | WO-2006/108913 A1 | 10/2006 |
| WO | WO-2013/126097 A1 | 8/2013 |

OTHER PUBLICATIONS

International Search Report, Corresponding to PCT/JP2014/002897, dated Aug. 12, 2014, 2pp.

* cited by examiner

| DISTANCE $r$ | $1/4\cdot(\lambda/2\pi)$ $\fallingdotseq 0.04\lambda$ | $1/2\cdot(\lambda/2\pi)$ $\fallingdotseq 0.08\lambda$ | $\lambda/2\pi$ $\fallingdotseq 0.16\lambda$ | $2\cdot(\lambda/2\pi)$ $\fallingdotseq 0.32\lambda$ | $\lambda$ | $2\lambda$ |
|---|---|---|---|---|---|---|
| CASE OF 950 MHz $r$ | 1.3cm | 2.5cm | 5.0cm | 10.1cm | 31.6cm | 63.2cm |
| QUASI-ELECTROSTATIC FIELD $(1/r^3)$ | 64 | 8 | 1 | $1/8\fallingdotseq 0.13$ | $\fallingdotseq 0.004$ | $\fallingdotseq 5\times 10^{-4}$ |
| INDUCTION FIELD $(1/r^2)$ | 16 | 4 | 1 | $1/4\fallingdotseq 0.13$ | $\fallingdotseq 0.025$ | $\fallingdotseq 6\times 10^{-3}$ |
| RADIATION FIELD $(1/r)$ | 4 | 2 | 1 | $1/2\fallingdotseq 0.5$ | $\fallingdotseq 0.16$ | $\fallingdotseq 0.08$ |

Fig. 5

Fig. 14
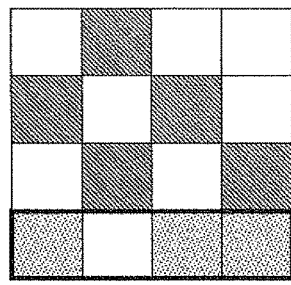
PATTERN E
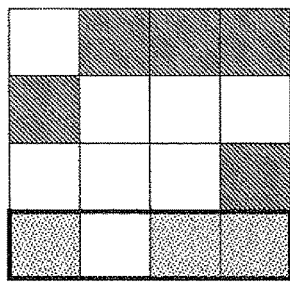
PATTERN F
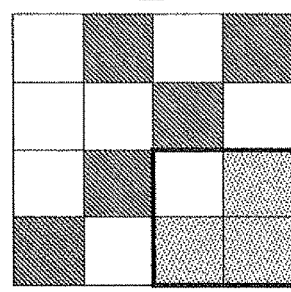
PATTERN G
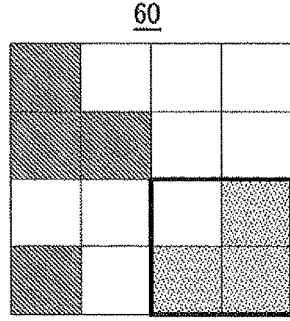
PATTERN H
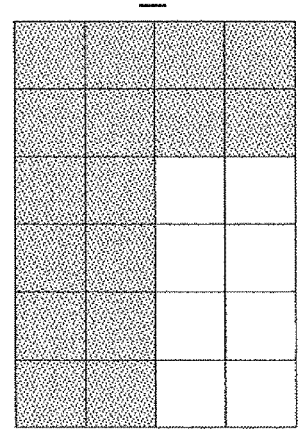
PATTERN I
(LEFT FOOT PATTERN)
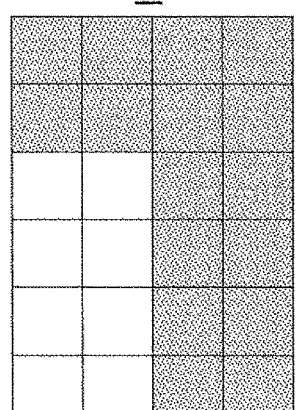
PATTERN J
(RIGHT FOOT PATTERN)
   FIRST PATTERN
(HIGH DIELECTRIC CONSTANT)
  SECOND PATTERN
(LOW DIELECTRIC CONSTANT)

ARTICLE MANAGEMENT SYSTEM AND ARTICLE MANAGEMENT METHOD

CROSS-REFERENCE TO RELATED APPLICATIONS

The present application is a national stage application of International Application No. PCT/JP2014/002897 entitled "Article Management System and Article Management Method," filed on Jun. 2, 2014, which claims the benefit of priority from Japanese Patent Application No. JP2013-233221, filed on Nov. 11, 2013, the disclosures of which are incorporated herein in their entirety by reference thereto.

TECHNICAL FIELD

The present invention relates to an article management system and an article management method which use RF tags.

BACKGROUND ART

An RFID (Radio Frequency IDentification) system, which has become popular in recent years, is used for article management, such as inventory management using RF tags attached to respective management target articles. In such an RFID system, RF tags are attached to respective management target articles, and the management target articles are managed in the following manner. That is, when the tag information of the RF tags can be read, it is determined that the management target articles are present, while when the tag information cannot be read, it is determined that the management target articles are not present. However, such an application of the RFID system has the following problems.

Firstly, there is a problem of unauthorized reading of tag information of RF tags. For example, in the case of using RF tags to manage commodities on store shelves in a retail store, a sales clerk who manages the commodities and consumers who plan to purchase the commodities can read the tag information of the RF tags which are attached to the respective commodities by a third party. In this case, for example, information on a commodity that is to be purchased or has already been purchased by a consumer can be linked to the consumer, which leads to a problem of invasion of privacy. Further, when raw materials stored in warehouses and products to be shipped are managed by the RFID system, a third party can read tag information of RF tags, which are respectively attached to the raw materials and products, so that the storage/delivery status of the raw materials and products can be disclosed to the third party. This poses an information security problem.

Secondly, there is a problem that the RF tags are costly. Currently, the cost of a UHF band tag has been reduced to less than about 10 yen. However, this cost is about two orders higher than the cost of a barcode that is used for article management, especially, commodity management. As a result, it is difficult in terms of cost to attach RF tags to respective articles for which the price is about 1000 yen or less.

A technique to solve such problems is disclosed in Patent Literature 1 to 5. Patent Literature 1 to 5 disclose a technique for managing articles in the same manner as in the method in which the RFID system is used. Specifically, Patent Literature 1 to 5 relate to a technique in which RF tags are provided on a shelf to monitor the presence or absence of an article on the shelf.

In Patent Literature 1 to 5, RF tags are arranged on a shelf. Articles are arranged such that each article to be managed (hereinafter referred to as "management target article") prevents an RFID reader from reading a plurality of RF tags arranged on the shelf. Specifically, in Patent Literature 1 and 2, the management target articles are arranged between the RF tags and an antenna attached to the RFID reader, and the management target articles arranged between the RFID reader and the shelf prevent the reading operation of the RFID reader. On the other hand, in Patent Literature 3 to 5, each RF tag and the RFID reader are arranged on the shelf side, and interference portions provided on the respective management target articles are moved closer to the RF tags, thereby interfering with the reading operation of the RFID reader. It is based on the premise that the articles that can be managed or the interference portions contain metal, water, or the like, which prevents transmission of energy at radio frequencies.

According to the above-mentioned techniques disclosed in Patent Literature 1 to 5, the RF tags are not attached to the respective management target articles and are left on the shelf. This avoids problems such as information security problems and invasion of privacy problems due to unauthorized reading of the tag information of the RF tags attached to the respective management target articles. According to the techniques disclosed in Patent Literature 1 to 5, the first problem due to unauthorized reading of the tag information of the RF tags by a third party does not occur. Further, according to the techniques disclosed in Patent Literature 1 to 5, the RF tags are not attached to the respective articles and are left on the shelf. Therefore, each RF tag can be repeatedly used, and thus the tag cost per article is substantially equal to a value obtained by dividing the price of a tag by the number of times the tag is used. That is, according to the techniques disclosed in Patent Literature 1 to 5, the second problem that the RF tags are costly can be solved by using the RF tags a sufficient number of times.

CITATION LIST

Patent Literature

[Patent Literature 1] U.S. Pat. No. 7,271,724
[Patent Literature 2] Japanese Unexamined Patent Application Publication No. 2009-051582
[Patent Literature 3] Japanese Unexamined Patent Application Publication No. 2005-38301
[Patent Literature 4] Japanese Patent No. 5128898
[Patent Literature 5] Japanese Unexamined Patent Application Publication No. 2010-211451

SUMMARY OF INVENTION

Technical Problem

However, in the above-mentioned techniques disclosed in Patent Literature 1 to 5, the ID of each RF tag placed in a fixed manner is read. This causes a problem that the management articles cannot be individually identified, though the presence or absence of the management target articles can be determined.

It is an object of the present invention to provide an article management system and an article management method that solve the above-mentioned problem.

Solution to Problem

An article management system according to the present invention includes: a reader antenna that transmits and receives a radio signal; a plurality of tag sheets each including an RF tag and placed on the reader antenna; an RFID reader that reads tag information unique to the RF tag via the reader antenna; and an identification mark attached to a management target article and arranged between the management target article and the tag sheets. On a surface of the identification mark that faces the tag sheets, an identification pattern for identifying the identification mark is formed of a first pattern and a second pattern, the second pattern having a dielectric constant or conductivity lower than that of the first pattern.

An article management method according to the present invention is an article management method for an article management system, the article management system including: a reader antenna that transmits and receives a radio signal; a plurality of tag sheets each including an RF tag and placed on the reader antenna; and an RFID reader that reads tag information unique to the RF tag via the reader antenna, the article management method including: recognizing, by the RFID reader, an identification pattern based on the tag information that can be read within a predetermined region and the tag information that cannot be read within the predetermined region; and identifying, by the RFID reader, a management target article based on the identification pattern, and identifying a location of the management target article.

Advantageous Effects of Invention

According to the present invention, a management target article can be identified in an article management system using an RF tag placed in a fixed manner.

BRIEF DESCRIPTION OF DRAWINGS

FIG. 5 is a table showing the dependence on a distance r which is normalized by a wavelength λ with respect to relative strengths of a quasi-static field, an induced field, and a radiative field in an electric field $E_θ$;

FIG. 14 is a diagram showing an example of an identification pattern of an identification mark according to a fourth exemplary embodiment.

DESCRIPTION OF EMBODIMENTS

First Exemplary Embodiment

Figure 1:
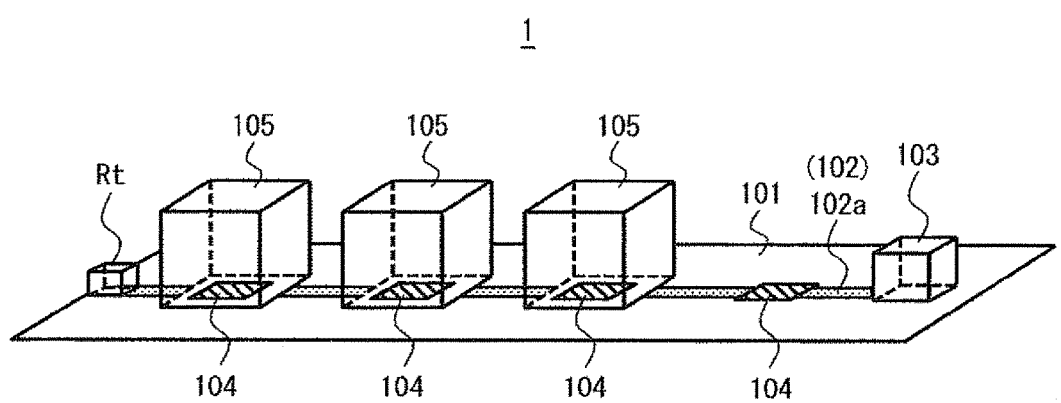
FIG. 1 is a schematic view of an article management system according to a first exemplary embodiment.

Embodiments of the present invention will be described below with reference to the drawings. Prior to the description of the overall article management system according to a first exemplary embodiment, the relationship between a reader antenna and an RF tag in the article management system according to the first exemplary embodiment will be described. FIG. 1 is a schematic view showing a part of the article management system according to the first exemplary embodiment. A part of the article management system according to the first exemplary embodiment is hereinafter referred to as an article management system 1. As shown in FIG. 1, the article management system 1 according to the first exemplary embodiment includes a reader antenna 102, an RFID reader 103, RF tags 104, and management target articles 105. The reader antenna 102 is composed of a dielectric layer 101, a strip conductor 102a, a ground conductor 102g, and a matched termination resistor Rt.

The dielectric layer 101 is, for example, a plate-like member formed of a dielectric material. A surface of the dielectric layer 101 on which each management target article is placed is hereinafter referred to as a front surface. The reader antenna is hereinafter denoted by 102, except in the case where the strip conductor and the ground conductor are individually described. The reader antenna 102 is formed of an open-type transmission line, which is terminated in an impedance matched state, and transmits and receives radio signals to and from the RF tag 104. The reader antenna 102 is a traveling-wave type near-field antenna for a reader that incorporates a micro-strip line which is an open-type transmission line. The reader antenna 102 can incorporate, as the open-type transmission line, a coplanar line, a grounded coplanar line, a slot line, a balanced two-wire transmission line, or the like, which generates an electromagnetic field distribution mainly composed of a quasi-static field and an induced electromagnetic field around the transmission line. Note that shielded transmission lines, such as a coaxial cable and a metal pipe waveguide, the periphery of which is shielded and around which no such electromagnetic field is generated, cannot be used as the reader antenna 102 without any special device to allow the electromagnetic field to leak.

The RFID reader 103 sends a transmitted signal to the reader antenna 102 and receives a response signal, which is generated by a tag antenna of the RF tag 104, via the reader antenna 102. Specifically, one end of the reader antenna 102 is connected to the RFID reader 103. Further, the RFID reader 103 sends the generated transmitted signal to the reader antenna 102, and transmits the transmitted signal to the tag antenna of the RF tag 104 which is electromagnetically coupled to the reader antenna 102. On the other hand, the RFID reader 103 receives the response signal which is generated by the RF tag 104 and is transmitted to the reader antenna 102 via radio communication. The matched termination resistor Rt is connected to the other end of the strip conductor of the reader antenna 102.

The RF tag 104 is placed at a location that is electromagnetically coupled to the reader antenna 102 and is visible from the reader antenna 102 in a state where the management target article is placed in the vicinity of the RF tag. This exemplary embodiment illustrates an example in which a passive tag is used as each RF tag 104, but an active tag can also be used as each RF tag 104. When the passive tag receives a signal for inquiring about an ID (hereinafter referred to as "tag information") from the reader antenna 102, the passive tag generates electric power that allows its own chip to operate, by using a power supply circuit (not shown) within the chip, based on a part of the signal obtained through the tag antenna. Further, the passive tag decodes a part of the received signal and generates received data. The passive tag then refers to tag information stored in a memory circuit within the chip, generates a modulated signal by causing a modulator (not shown) to operate, and transmits the modulated signal to the reader antenna 102 via the tag antenna.

Each management target article 105 is arranged at a location that is electromagnetically coupled to the tag antenna of the corresponding RF tag 104. A location where the management target article 105 is arranged is hereinafter referred to as a management target article arrangement region 110. An article containing a material with a high relative permittivity, such as moisture, or an article containing metal, is preferably used as the management target article 105, but the management target article 105 is not limited thereto. Specifically, not only a bottled beverage, a canned beverage, and a snack packaged in aluminum, but also a thick paper bundle, such as a book, a rice ball, bread, a side dish packed in a plastic container, a hand or a foot of a human body, and shoes can be used as the management target article. Thus, various articles, including articles containing a large amount of moisture, can be dealt with. This is attributable to the use of an RFID system in a UHF band or a microwave band. In the RFID system used in a frequency band of 13.56 MHz or less, the skin depth is large and thus the reaction to moisture is extremely low. In these frequency bands, electromagnetic induction is used for coupling between a reader and a tag. Since the electromagnetic induction is one type of magnetic coupling, the electromagnetic induction is sensitive to a difference in relative magnetic permeability, but is not sensitive to a difference in relative permittivity. Accordingly, even when the relative permittivity of water is 80, which is extremely high, the operation of the tag antenna does not react sensitively to moisture in the electromagnetic induction. In general, many materials, except magnetic materials, have a relative magnetic permeability of approximately 1. On the other hand, the relative permittivity is greatly different from 1 in many cases. Unlike the RFID system depending only on the electromagnetic induction, the present invention uses electromagnetic components of a quasi-electromagnetic field, an induced electromagnetic field, and a radiative electromagnetic field, which leads to an increase in the degree of freedom of relative arrangement of the tag and the reader antenna. For example, there is no need for an alignment to allow a magnetic flux generated in the reader antenna to penetrate through a coil-like antenna of a tag as in the RFID system using the electromagnetic induction, or the conditions for the alignment are relaxed. When a higher frequency band is used, the data rate also becomes higher than that in the case of the RFID system using the electromagnetic induction. Accordingly, it is preferable to use the RFID system in a UHF band or a microwave band. Note that each RF tag 104 may be covered with a plastic plate or the like. This contributes to an increase in the durability of each tag. Although a small amount of moisture, such as condensation, may be present on the front surface of each RF tag in some cases, the effect of the small amount of moisture can be eliminated by adjusting the coupling coefficient or the like between the tag antenna and the management target article.

The operation of the article management system 1 according to the first exemplary embodiment will now be described. The article management system 1 detects the presence or absence of each management target article based on the response signal generated by each RF tag 104. In the detecting operation, the article management system 1 first sends a tag information read command as a transmitted signal from the RFID reader 103 via the reader antenna 102.

Next, the RF tag 104 receives the transmitted signal. The RF tag 104 then generates electric power by using a part of the received signal, and starts the operation. After that, the RF tag 104 decodes the received signal and reproduces the received data included in the received signal. The RF tag 104 refers to the received data and the tag information stored in the built-in memory circuit. When there is a need to send a response by making a determination based on the tag information and the received data, the modulated signal generated based on the tag signal is sent to the reader antenna 102 as a response signal.

At this time, the RFID reader 103 determines the presence or absence of the management target article based on a change in the intensity or phase of the response signal from the RF tag 104 corresponding to the sent tag information read command. In a more specific example, when the signal intensity of the response signal from the RF tag 104 is high, the RFID reader 103 determines that the management target article is not present, and when the signal intensity of the response signal from the RF tag 104 is low, the RFID reader 103 determines that the management target article is present. For example, in the example shown in FIG. 1, the management target article is not present on the RF tag 104 that is arranged on the rightmost side of the figure. Accordingly, the RF tag 104 can send the response signal with a signal intensity higher than that in the case where the management target article is present, and thus the RFID reader 103 determines, based on the signal intensity, that the management target article 105 is not present at the location corresponding to the RF tag 104. On the other hand, the management target articles 105 are respectively placed on the three other RF tags 104 shown in FIG. 1. Accordingly, the signal intensity of the response signal sent by each of the three other RF tags 104 is lower than that in the case where the management target article is not present. Therefore, the RFID reader 103 determines that the management target articles 105 are present at the locations respectively corresponding to the three other RF tags 104. The example in which the signal intensity of the response signal is low includes the case where the response signal cannot be detected when the intensity of the response signal is lower than what can be detected by the receiving sensitivity of the RFID reader 103. Assume herein that the RFID reader 103 is connected to a computer, or functions as a part of the computer, and the determination as to whether the management target article 105 is present or not is executed by the computer.

As described above, the signal intensity of the response signal changes due to the electromagnetic coupling between the management target article 105 and the tag antenna of the RF tag 104. In this regard, the positional relationships among the management target article 105, the RF tag 104, and the reader antenna 102 will be described in more detail below.

Figure 2:
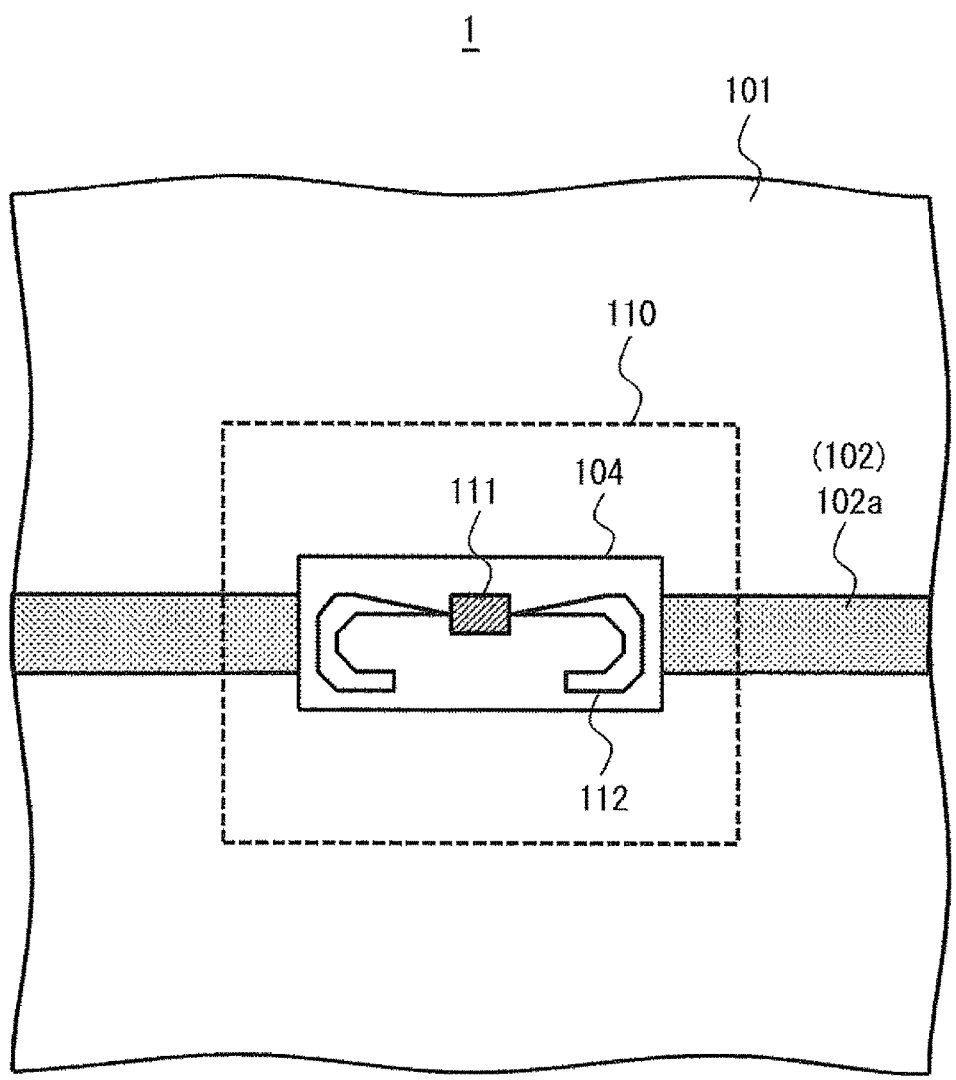
FIG. 2 is a top view of the article management system according to the first exemplary embodiment, which shows the arrangement of a management target article and the positional relationship between an RF tag and a reader antenna in the article management system.

First, FIG. 2 shows a top view of the article management system 1 according to the first exemplary embodiment. FIG. 2 shows an enlarged top view of a region in which one management target article 105 is placed. As shown in FIG. 2, in the article management system 1, the strip conductor 102a of the reader antenna 102 is formed on the dielectric layer 101. The RF tag 104 is placed above the strip conductor 102a. Further, the management target article arrangement region 110 in which the management target article is placed is set in a location that covers the RF tag 104 and is above the RF tag 104. Although the management target article arrangement region 110 is set in a location that covers the RF tag 104 as described above, the arrangement of the RF tag 104 and the management target article arrangement region 110 is not limited to this, as long as the RF tag 104 and the management target article are close enough to each other that they are sufficiently electromagnetically coupled together. The RF tag 104 includes an RFID chip 111 and a tag antenna 112.

Figure 3:
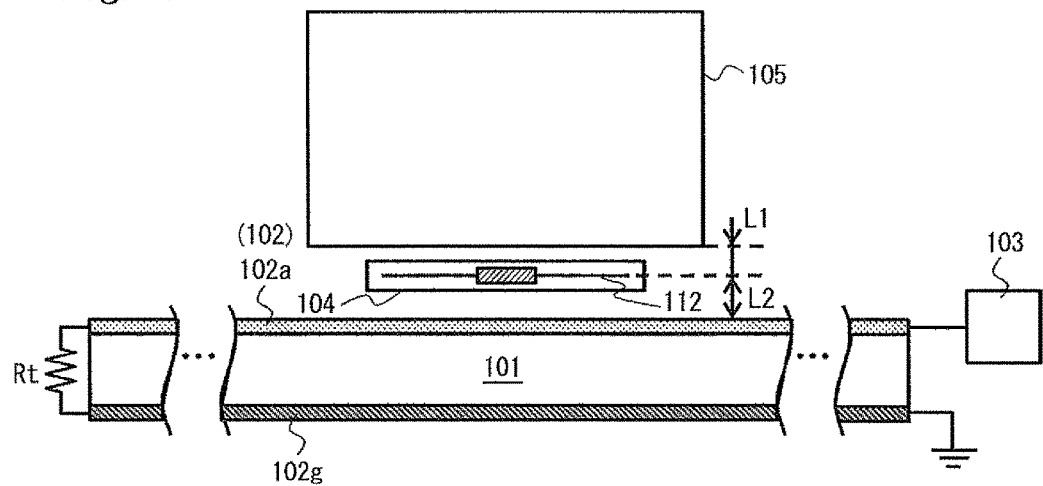
FIG. 3 is a front sectional view of the article management system according to the first exemplary embodiment, which shows the arrangement of the management target article and the positional relationship between the RF tag and the reader antenna in the article management system.

Next, FIG. 3 shows a front sectional view of the article management system 1 according to the first exemplary embodiment. As in FIG. 2, FIG. 3 shows an enlarged view of the region in which one management target article 105 is placed. As shown in FIG. 3, in the article management system 1, the strip conductor 102a is formed on the front surface of the dielectric layer 101, and the ground conductor 102g is formed on the back surface of the dielectric layer 101, thereby constituting a micro-strip line which is one type of open-type electric transmission lines that form the reader antenna 102. One end of the strip conductor 102a is connected to the ground conductor 102g through the matched termination resistor Rt. The RFID reader 103 is connected to the other end of the strip conductor 102a. This connection enables the strip conductor 102a to be terminated in an impedance matched state. Note that a cover for improving mainly the durability may be arranged above the strip conductor 102a, or below the ground conductor 102g.

As shown in FIG. 3, the management target article 105 is arranged at a location where the distance between the management target article and the tag antenna 112 of the RF tag 104 corresponds to a first distance L1. The tag antenna 112 of the RF tag 104 is arranged at a location where the distance between the tag antenna and the reader antenna 102 corresponds to a second distance L2. It is preferable that the first distance L1 and the second distance L2 be set to satisfy the relationship of L1<L2. This facilitates the setting of the relationship between coupling coefficients k1 and k2, which are described later, to satisfy k1<k2. FIG. 3 illustrates only the relationship between the distances among the management target article 105, the tag antenna 112, and the reader antenna 102. However, in the case where the RF tag 104 is covered with a plastic plate or the like, for example, so as to satisfy the above-mentioned relationship between the distances, the thickness of the plastic plate can also be used. Specifically, the RF tag 104 is built in a plastic plate and a sheet having the RF tag incorporated therein is formed using the plastic plate, thereby making it possible to secure the relationship between the first distance L1 and the second distance L2. The method of forming a sheet using a plastic plate is one mode for securing the relationship between the first distance L1 and the second distance L2, and other methods can also be used. More precisely, an electrical length in consideration of the rate of a wavelength shortening is preferably used as the "distance" herein used. A line-of-sight distance is more preferably used as the "distance" herein used.

Figure 4:
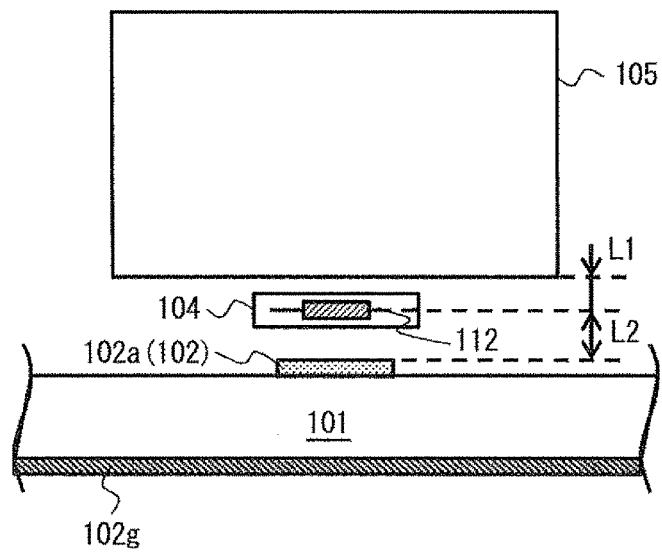
FIG. 4 is a side sectional view of the article management system according to the first exemplary embodiment, which shows the arrangement of the management target article and the positional relationship between the RF tag and the reader antenna in the article management system.

Next, FIG. 4 shows a side sectional view of the article management system 1 according to the first exemplary embodiment. As in FIG. 2, FIG. 4 shows an enlarged view of the region in which one management target article 105 is placed. As shown in FIG. 4, in the first exemplary embodiment, the strip conductor 102a is placed in a part of the region below the RF tag 104. Further, in the article management system 1, the RF tag 104 and the management target article 105 are placed in such a manner that the relationship between the first distance L1 and the second distance L2 satisfies the condition of L1<L2 also in a side view.

The effects of the relationships among the components of the article management system 1 will now be described in more detail with reference to FIGS. 2 to 4.

Referring first to FIG. 2, in the article management system 1, the management target article 105 is arranged above the tag antenna 112 of the RF tag 104 so that the distance between the management target article 105 and the tag antenna 112 corresponds to the first distance L1. The reader antenna 102 connected to the RFID reader 103 is arranged below the RF tag 104 so that the line-of-sight distance between the reader antenna 102 and the tag antenna 112 corresponds to the second distance L2. Thus, in the article management system 1, the management target article 105 is arranged in a region other than the region sandwiched between the reader antenna 102 and the RF tag 104. This prevents the management target article 105 from blocking the line of sight between the reader antenna 102 and the RF tag 104. In the article management system 1, the distance between the reader antenna 102 and the tag antenna 112 is referred to as the second distance L2.

As described above, in the article management system 1, the first distance L1 between the management target article 105 and the tag antenna 112 and the second distance L2 which is the line-of-sight distance between the tag antenna 112 and the reader antenna 102 are adjusted. Further, in the article management system 1, the first distance L1 and the second distance L2 are adjusted to thereby adjust the coupling coefficient k2 between the management target article 105 and the tag antenna 112 and the coupling coefficient k1 between the tag antenna 112 and the reader antenna 102. Furthermore, in the article management system 1, the signal intensity between the tag antenna 112 and the reader antenna 102 is changed according to the coupling coefficient k2, which changes depending on whether the management target article 105 is present or not, and the presence or absence of the management target article 105 is determined based on a change in the signal intensity.

Accordingly, the effects of the article management system 1 according to the first exemplary embodiment based on the relationships and settings of the first distance L1, the second distance L2, and the coupling coefficients k1 and k2 will be described below. While the present invention uses the electromagnetic coupling, the coupling coefficients each representing the strength of the electromagnetic coupling can be evaluated relatively easily by an electromagnetic field simulator. In the description of the electromagnetic coupling, assuming that the wavelength of the radio signal between the tag antenna 112 and the reader antenna 102 is represented by θ, a field at a distance of less than $\lambda/2\pi$ (π represents a circular constant) from a wave source (for example, an antenna) is referred to as a reactive near-field, and a field at a distance of more than $\lambda/2\pi$ (and less than λ from the wave source is referred to as a radiative near-field. These two fields are collectively referred to as a near-field region.

In this near-field, the electromagnetic field shows complexities, and the quasi-static electromagnetic field, the induced electromagnetic field, and the radiative electromagnetic field are present at a non-negligible strength ratio. Vectors of the combined electromagnetic fields spatially and temporally change in various manners. For example, in the case where an infinitesimal dipole antenna is used as the wave source, when an electric field E[V/m] and a magnetic field H[A/m], which are formed by the antenna, are represented by a spherical coordinate system (r, θ, φ) and phasor representation, the following Expressions (1) to (4) are obtained.

$$E_\theta = \frac{ql}{4\pi\varepsilon}\left\{\frac{1}{r^3} + \frac{1}{r^2} \cdot \frac{1}{(\lambda/2\pi)} \cdot e^{j\frac{\pi}{2}} + \frac{1}{r} \cdot \frac{1}{(\lambda/2\pi)^2} \cdot e^{j\pi}\right\} \cdot e^{-jkr} \cdot \sin\theta \quad (1)$$

$$E_r = \frac{ql}{2\pi\varepsilon}\left\{\frac{1}{r^3} + \frac{1}{r^2} \cdot \frac{1}{(\lambda/2\pi)} \cdot e^{j\frac{\pi}{2}}\right\} \cdot e^{-jkr} \cdot \cos\theta \quad (2)$$

$$H_\phi = \frac{ql}{4\pi\sqrt{\varepsilon\mu}}\left\{\frac{1}{r^2} \cdot \frac{1}{(\lambda/2\pi)} \cdot e^{j\frac{\pi}{2}} + \frac{1}{r} \cdot \frac{1}{(\lambda/2\pi)} \cdot e^{j\pi}\right\} \cdot e^{-jkr} \cdot \sin\phi \quad (3)$$

$$E_\phi = H_\theta = H_r = 0 \quad (4)$$

In the above Expressions (1) to (4), an electric charge stored in the infinitesimal dipole antenna is represented by q[C]; the length of the antenna is represented by 1[m]; the wavelength is represented by λ[m]; and the distance from the wave source to an observation point is represented by r[m]. Further, π represents a circular constant; ∈ represents a relative permittivity; and μ represents a magnetic permeability. In the Expressions (1) to (4), the term proportional to $1/r^3$ represents the quasi-static field; the term proportional to $1/r^2$ represents the induced field; and the term proportional to $1/r$ represents the radiative field. The dependence of these electromagnetic components on a distance r varies, and thus the relative strengths of the electromagnetic components change depending on the distance r.

FIG. 5 is a table showing the dependence on the distance r which is normalized by the wavelength λ with respect to relative strengths of the quasi-static field, the induced field, and the radiative field in the electric field $E_\theta$. The second row in the table of FIG. 5 shows distances converted at a free space wavelength of 950 MHz, which is substantially equal to the frequency of the UHF (Ultra High Frequency) band RFID that is allowed by the Radio Regulations in Japan.

As is obvious from the table shown in FIG. 5, as the distance r increases, the strengths of the electric fields decrease and the ratio of the respective components also varies. For example, in a region where $r<\lambda/2\pi$, the field strengths increase in the order of the quasi-static electric field, the induced electric field, and the radiative electric field, and in a region where $r>\lambda/2\pi$, the field strengths decrease in the order of the quasi-static electric field, the induced electric field, and the radiative electric field. Further, in a region where r>λ, the contribution of each of the quasi-static electric field and the radiative electric field is extremely small, and there are almost no components other than the radiative electric field components in a far-field region where r>2λ. On the other hand, in a region where r<λ, the contribution of each of the quasi-static electric field and the induced electric field remains sufficient, and in a reactive near-field where $r<\lambda/2\pi$, the contribution of each of the quasi-static electric field and the induced electric field is large. As shown in Expressions (1) to (4), in comparison with the radiative electric field, the quasi-static electric field and the induced electric field include an r-direction component and an φ-direction component, as well as a θ-direction component, and thus include components in various directions.

In general, in comparison with the electromagnetic field that is radiated from an antenna and propagates in the air, in the reactive near-field as described above, the quasi-static electromagnetic field and the induced electromagnetic field which remain in the vicinity of the antenna are dominant, and the absolute electromagnetic field strength is high. In the radiative near-field, the absolute electromagnetic field strength generally decreases as the distance from the wave source increases. Further, the relative strengths of the quasi-static electromagnetic field and the induced electromagnetic field decrease, and the relative strength of the radiative electromagnetic field increases. As described above, the quasi-static electromagnetic field and the induced electromagnetic field are present in the near-field, and these electromagnetic fields generate coupling between the reader antenna 102 and the tag antenna 112 and coupling between the tag antenna 112 and the management target article 105.

In a passive RFID system that uses a normal UHF band or microwave band, the distance r between the reader antenna 102 and the tag antenna 112 satisfies the relationship of r>λ, and the radiative electromagnetic field is used for communication. In order to efficiently generate the radiative electromagnetic field, a resonance antenna typified by a patch antenna is used as the reader antenna 102. When such a resonance antenna is used in the near-field where r<λ, the strength of the electromagnetic field changes greatly depending on the location along the antenna due to a standing wave in the resonance antenna. For example, in the vicinity of the peak of the standing wave, the amplitude becomes a maximum, and at the midpoint of the standing wave, the amplitude becomes 0. Accordingly, when the distance r between the reader antenna 102, for which the resonance antenna is used, and the tag antenna 112 satisfies the relationship of r<λ, the tag antenna cannot receive the signal from the reader antenna, or the received signal intensity is extremely low, in a portion near the midpoint of the standing wave in the reader antenna. In other words, a dead region is formed, which poses a problem for the use of the system.

In view of the above, the system disclosed in Patent Literature 1 has no choice but to adopt a mode in which the RFID reader is placed at a location sufficiently spaced apart from the shelf, on which articles are placed, the articles 105, and the RF tags, to thereby cause radio waves to be emitted from the reader antenna, which is sufficiently smaller than the shelf, and secure a wide coverage area. Accordingly, the system disclosed in Patent Literature 1 requires a large space between the RFID reader and each RF tag. Depending on the quality of material of the shelf, especially when the shelf is formed of a metallic material, for example, a multipath phenomenon occurs, which makes the tag reading unstable due to interference of radio waves, and thus makes it difficult to read the tag information in some cases, regardless of whether the management target article is present or not. If a person or an object enters the space between the locations at which the reader antenna and the articles are placed, problems occur in which the tag information cannot be read as in the case where the articles are present, or an erroneous detection occurs even in the state where there is no article.

On the other hand, a coupled circuit can be formed by electromagnetically coupling antennas through the quasi-static electromagnetic field and the induced electromagnetic field which are present in the near-field where r<λ, more preferably, in the reactive near-field where r<λ/2π. In this case, the above-mentioned necessity of a large space between the RFID reader and each RF tag is eliminated. However, if a resonance antenna is simply used as the reader antenna 102, a dead region is formed, which poses a problem for the use of the system. Further, if a standing wave antenna which generally has a size of about λ is used in the vicinity of a tag, the coverage area is extremely narrow.

Therefore, in the article management system 1 according to the first exemplary embodiment, the reader antenna 102 connected to the RFID reader 103 is formed of an open-type transmission line, which is terminated in an impedance matched state, and each RF tag 104 is arranged in such a manner that the open-type transmission line and the tag antenna 112 of the RF tag 104 are electromagnetically coupled together. Further, in the article management system 1, the open-type transmission line with little electromagnetic radiation is used as the reader antenna 102 of the RFID reader 103, to thereby form a coupled circuit by electromagnetically coupling the reader antenna 102 and the tag antenna 112 through the quasi-static electromagnetic field and the induced electromagnetic field which are generated around the open-type transmission line. In other words, the open-type transmission line is used as a traveling-wave antenna that operates in the near-field. This configuration eliminates the need for a large space between the reader antenna 102 and the RF tag 104. Further, the reader antenna 102 and the tag antenna 112 communicate with each other through the coupled circuit at locations within a short distance from each other. This prevents an erroneous detection due to the occurrence of the multipath phenomenon, or due to the situation in which a person or an object enters the space between the locations at which the reader antenna 102 and the management target articles 105 are placed. Furthermore, since the open-type transmission line, which is terminated in an impedance matched state, is used as the reader antenna 102, the main components of electromagnetic waves propagating through the antenna do not generate any standing wave, and propagate as a traveling wave to the matched termination. Strictly speaking, the phrase "do not generate any standing wave" herein used means that the standing wave is sufficiently small, and that the standing wave ratio is a value equal to 2 or less, preferably, a value equal to 1.2 or less.

When the termination of the transmission line is matched at a sufficient accuracy, or when the electromagnetic waves propagating through the transmission line attenuate to a sufficient degree in the vicinity of the termination, a large standing wave is not generated within the transmission line and the traveling wave serves as a main component. The use of an electromagnetic field distribution in the transmission line enables formation of the traveling-wave antenna. Furthermore, in the electromagnetic field generated in the space in the vicinity of the line, the radiative electromagnetic field is relatively small, and the quasi-static electromagnetic field and the induced electromagnetic field are main components. The electromagnetic field strengths of the quasi-static electromagnetic field and the induced electromagnetic field are higher than the strength of the radiative electromagnetic field. Even when the reader operates at the same output, the electromagnetic field strength obtained by each RF tag 104 is increased. In other words, it is possible to create an environment in which the radiative electromagnetic field is prevented from spreading peripherally, while ensuring the operation of each tag.

In the standing wave antenna, such as the patch antenna, which is generally used, the electromagnetic field distribution in the vicinity of the antenna is extremely uneven due to the standing wave within the antenna. Since it is necessary to avoid the dead region, the region in which the management target articles 105 can be managed is limited. On the other hand, in the case of the traveling-wave antenna formed of the open-type transmission line described above in regard to this exemplary embodiment, even in the vicinity of the antenna, there is no constant portion, such as a node, in the electromagnetic field distribution, and the entire field distribution changes constantly. Accordingly, since the electromagnetic field associated with the standing wave along the antenna is uniform also in the near-field, there is no area in which the tag information of the RF tags 104 cannot be read. That is, the degree of freedom of arrangement of the reader antenna 102 and the tag antenna 112 is increased.

The article management system 1 performs communication through the electromagnetic coupling between the reader antenna 102 and the tag antenna 112 by using the traveling wave as a signal. Therefore, unlike in the resonance antenna, no dead region is formed, and thus the system can be used without any problem. Consequently, in the article management system 1, a wide coverage area can be secured by extending the transmission line, regardless of the wavelength, within the range in which the strengths of the quasi-static electromagnetic field and the induced electromagnetic field, which are generated around the open-type transmission line, are large enough to cause the RF tags 104 to operate. That is, in the article management system 1 according to the first exemplary embodiment, the use of the open-type transmission line as described above suppress a radiation loss of electric power and facilitates enlargement of the coverage area.

Note that the term "open-type transmission line" herein used refers to an open-type transmission line that is basically used for transmitting electromagnetic waves in the longitudinal direction of the line, while suppressing the radiation of electromagnetic waves. Examples of the open-type transmission line include a balanced two-wire transmission line, transmission lines similar to the balanced two-wire transmission line, transmission lines such as a micro-strip line, a coplanar line, and a slot line, and variations of these transmission lines, such as a grounded coplanar line and a tri-plate line. Depending on the conditions, it is possible to use an antenna that extends in a planar shape and transmits signals by changing the electromagnetic field in a narrow space region between a mesh-like conductor portion and a sheet-like conductor portion and in a leaching region on the outside of the mesh-like conductor portion. The antenna extending in a planar shape also operates as a traveling-wave antenna, though the antenna has a standing wave and thus is not perfect. If the unevenness of the electromagnetic field distribution caused by the standing wave can be ignored, the antenna can be used. On the other hand, shielded transmission lines, such as a coaxial cable and a metal pipe waveguide, the periphery of which is shielded and around which the above-mentioned electromagnetic field is not generated, cannot be used without any special device for leaking the above-mentioned electromagnetic field.

There is also an electromagnetic wave transmission sheet that causes an electromagnetic field to travel in a desired direction by allowing the electromagnetic field to be present in a narrow space region between opposed conductive sheet materials, and by changing the voltage between the two conductive sheet materials to thereby change the electromagnetic field, or by changing the electromagnetic field to thereby change the voltage between the conductive sheet materials. In a broader sense, this electromagnetic wave transmission sheet can also be regarded as one type of the open-type transmission line of the present invention when it is viewed along the longitudinal direction of the sheet. However, it cannot be said that providing the electromagnetic wave transmission sheet is always the optimum way to carry out the present invention, because a standing wave is present in the sheet. In the case of the electromagnetic wave transmission sheet, it can be assumed that the upper surface of the waveguide has a metal mesh which is sufficiently finer than the wavelength and an evanescent wave leaks from the upper surface. The transmission line having a plurality of slots, which are generally formed at intervals of less than $\frac{1}{10}$ of the wavelength and with a width and a length of less than $\frac{1}{10}$ of the wavelength and through which the electromagnetic field leaks, can be regarded as one type of the open-type transmission line of the article management system 1 according to the first exemplary embodiment.

On the other hand, the open-type transmission line of the article management system 1 according to the first exemplary embodiment differs from the traveling-wave antenna for electromagnetic radiation in the far-field, which uses a so-called crank line antenna, meander line antenna, leaky coaxial cable, or the like to obtain a constant radiation field strength by designing a crank shape to cause the open-type transmission line to emit strong electromagnetic waves, or by actively utilizing a higher-order mode. In such an antenna, the radiation occurs preferentially from the crank shape or slots periodically formed with a size of about the wavelength, generally, with a size of $\frac{1}{10}$ or more of the wavelength. Accordingly, the strength of the electromagnetic field changes greatly in some positions, as in the resonance antenna described above. For this reason, the use of the traveling-wave antenna in the near-field makes the reading of tag information unstable, or makes it difficult to read tags in some locations, which poses a problem for the use of the system. Furthermore, in a UHF band RFID system, different frequencies are allocated to nations around the world and are distributed in a bandwidth of approximately 860 to 960 MHz. This provides a wide fractional bandwidth of about 10% and thus a major change in the design of the resonance point of the resonance antenna or in the pitch of the crank, meander, or slots is required. On the other hand, the article management system 1 according to the first exemplary embodiment uses the open-type transmission line with an extremely wide bandwidth, which makes it possible to use the same antenna as the reader antenna 102 without any special change.

In the article management system 1 according to the first exemplary embodiment, the management target article arrangement region 110 in which each management target article 105 is placed so as to be spaced apart from each RF tag 104 is formed so that the management target article 105 and the tag antenna 112 of each RF tag 104 can be electromagnetically coupled together. Accordingly, when the management target article 105 is present, the management target article 105 and the tag antenna 112 form a coupled circuit, so that the resonance frequency of the tag antenna 112 changes and the feeding point impedance of the tag antenna 112 changes, unlike in the case where the management target article 105 is not present. The tag antenna 112 is generally configured to resonate at a frequency of a signal used for communication in a free space and to have an adjusted feeding point impedance and a maximum receiving sensitivity. The above-mentioned changes lower the receiving sensitivity and have an adverse effect on the operation of the tag antenna 112 when a reflected signal is sent to the RFID reader 103. As a result, the power receiving sensitivity with respect to the signal used for the communication is lowered. Further, the transmission output of the signal reflected by the RF tag 104 is also lowered. Accordingly, the RF tag 104 cannot receive the signal from the RFID reader 103. Otherwise, the power receiving intensity of the signal is so low that tag operating power cannot be secured, or tags cannot generate a reflected electromagnetic field of sufficient intensity. As a result, the RFID reader 103 cannot read the tag information of the RF tag 104. Otherwise, the intensity or phase of the reflected electromagnetic field reaching the RFID reader 103 changes greatly in accordance with a change in the resonance frequency of the tag. That is, when the management target article 105 is present in the management target article arrangement region 110, the tag information cannot be read, or the intensity or phase of the reflected electromagnetic field from the RF tag 104 changes greatly as compared to the case where the management target article 105 is not present, so that the RFID reader 103 can detect that the management target article 105 is present. In other words, as a result of the occurrence of a change in the operating characteristics of the tag antenna 112 depending on the presence or absence of the management target article 105, the RFID reader 103 can detect a change in the intensity or phase of the reflected signal from the RF tag 104 and can also detect the presence or absence of the management target article based on the detection result.

Thus, in the article management system 1 according to the first exemplary embodiment, it is not necessarily required for each management target article 105 to block the line of sight between the RF tag 104 and the RFID reader 103 in order to detect the presence or absence of the management target article 105. It is only necessary to provide a location where the management target article 105 is placed so as to be spaced apart from the tag antenna 112 (or the RF tag 104) so that the management target article 105 and the tag antenna 112 can be electromagnetically coupled together. Therefore, the location where each article to be managed is placed is not limited to the location between the RFID reader 103 and each RF tag 104, and thus the articles can be arbitrarily arranged.

The article management system 1 according to the first exemplary embodiment determines a change in the operating characteristics of the tag antenna 112 based on a change in the read signal of the tag information in the RFID reader 103 through the reader antenna 102, instead of simply detecting that articles are arranged in the vicinity of the power-fed reader antenna 102 based on a change in the operating characteristics of the reader antenna 102. The interposition of the RF tags 104 increases the degree of freedom with which the reader antenna 102 and the management target articles 105 can be positioned relative to each other. The arrangement of a plurality of RF tags 104 makes it possible to detect the presence or absence of a plurality of management target articles 105 by using a single reader antenna 102 and a single RFID reader 103. Further, the electromagnetic field formed by the tag antenna 112 at a location where the management target articles 105 are arranged includes not only the components of the radiative electromagnetic field, but also the components of the induced electromagnetic field and the induced electromagnetic field. Accordingly, the electromagnetic components spread in various directions, unlike the radiation field components in a normal far-field. Therefore, the article management system 1 according to the first exemplary embodiment can increase the degree of freedom with which the articles to be managed and the tags can be positioned relative to each other.

In the article management system 1 according to the first exemplary embodiment, which is based on the RFID system, each RF tag 104 has a unique ID (tag information) and multiple access can be achieved based on the tag information. Accordingly, if the tag information of each RF tag 104 is linked to the location where the corresponding management target article 105 is arranged, the location where the management target article 105 is present can be identified based on the tag information of the RF tag 104 which cannot be read. On the other hand, when the management target article 105 is not present, the RF tag 104 can respond to the signal from the RFID reader 103 and the RFID reader 103 can read the tag information of the RF tag 104. Accordingly, since the tag information of the RF tag 104 can be read with a normal strength of the reflected electromagnetic field when the management target article 105 is not present, the absence of the management target article 105 can be detected. Further, a location where the management target article 105 is not present can be identified based on the read tag information of the RF tag 104. Also in the case of managing a plurality of management target articles 105, the locations where the management target articles 105 are respectively arranged can be identified to manage the articles, because the tag information pieces that are linked to the locations where the management target articles 105 are respectively arranged are different from each other. Since the presence or absence of the management target articles 105 can be detected as described above, the article management system 1 according to the first exemplary embodiment can manage the presence or absence of the management target articles 105, without the need for attaching the RF tags 104 to the respective articles.

In the article management system 1 according to the first exemplary embodiment, it is only necessary to provide a location where each management target article 105 is placed so as to be spaced apart from each RF tag 104 so that the management target article 105 and the tag antenna 112 of each RF tag 104 can be electromagnetically coupled together. Accordingly, since the RF tags 104 can be repeatedly used without the need for attaching the RF tags 104 to the respective management target articles 105, the tag cost per article is substantially equal to a value obtained by dividing the price of a tag by the number of times the tag is used. That is, the problem that the RF tags 104 are costly can be solved by using the tags a sufficient number of times, as a matter of course.

In the article management system 1 according to the first exemplary embodiment, the RF tags 104 are not attached to the respective management target articles 105. This avoids problems such as information security problems and invasion of privacy problems due to unauthorized reading of the RF tags 104 attached to the respective management target articles 105. That is, in the article management system 1 according to the first exemplary embodiment, the problem of unauthorized reading of the tag information by a third party does not occur.

In the article management system 1 according to the first exemplary embodiment, assuming that the wavelength of the signal used for communication between the RFID reader 103 and the RF tag 104 is represented by $\theta$, the management target article arrangement region 110 in which the management target article 105 is placed is formed such that the first distance L1 between the management target article 105 and the tag antenna 112 satisfies the relationship of $L1 \leq \lambda$. In the article management system 1 according to the first exemplary embodiment, the second distance L2 which is the line-of-sight distance between the reader antenna 102 of the RFID reader 103 and the tag antenna 112 of the RF tag 104 satisfies the relationship of $L2 \leq \lambda$. The term "distance" used in the article management system 1 according to the first exemplary embodiment refers to a radio-wave propagation distance. The distance is approximately equal to the geometrically shortest distance.

If the distance L1 between the tag antenna 112 of the RF tag 104 and the management target article arrangement region 110 in which the management target article 105 is arranged satisfies the relationship of $L1 \leq \lambda$, the location where the article is arranged falls within the near-field when viewed from the RF tag 104. Accordingly, when the respective contributions of the induced electromagnetic field and the induced electromagnetic field are sufficiently large and the management target article 105 includes a material having a high relative permittivity, such as moisture, or metal, and when the management target article 105 is present in the management target article arrangement region 110, the tag antenna 112 and the management target article 105 can be electromagnetically coupled together through the induced electromagnetic field or the induced electromagnetic field. A human body which contains a large amount of water can also be detected as the management target article 105, and can also be used to manage the traffic line of a person.

When the first distance L1 is set to a value that satisfies $L1 \leq \lambda$, the quasi-static electromagnetic field and induced electromagnetic field components having a non-negligible strength are present in the near-field of the tag antenna 112. These electromagnetic components cause electromagnetic coupling between the tag antenna 112 and the management target article 105 through a mutual inductance, a capacitance, or the like. Accordingly, depending on the presence or absence of the management target article 105, the circuit constant of the tag antenna 112 changes and the operating characteristics of the tag antenna 112 also change. A more noticeable change depending on the presence or absence of the management target article 105 is a change in the resonance frequency of the tag antenna 112. When commercially-available RF tags are used as the RF tags 104 in order to suppress the cost of the system, a standing wave antenna based on a dipole antenna is used as the tag antenna 112. In such RF tags 104, a high sensitivity can be achieved by setting the resonance frequency of the tag antenna 112 in accordance with the frequency of the radio communication. Thus, the state in which the resonance frequency of the tag antenna 112 resonates at a set frequency corresponds to the state in which the management target article 105 is not present.

Next, when the management target article 105 is placed on the RF tag 104, the tag antenna 112 is coupled to the management target article 105, resulting in a substantial decrease in the resonance frequency. Accordingly, the sensitivity of the tag antenna 112 at the frequency of the radio communication is considerably lowered. For example, if the operating power for the RFID chip 111 cannot be covered due to a reduction in the receiving sensitivity, the RF tag 104 does not respond to an inquiry from the RFID reader 103. Even if the operating power can be covered, the tag antenna 112 cannot cause the modulated signal, which is generated in the RFID chip 111, to change the electromagnetic field space with a sufficient strength.

As a result, when the management target article 105 is present, the RF tag 104 does not respond to an inquiry from the RFID reader 103, or the strength of the reflected electromagnetic field from the RF tag 104 changes greatly, unlike in the case where the management target article 105 is not present. The RFID reader 103 detects a change in the strength of the reflected electromagnetic field, thereby making it possible to determine that the management target article 10 is absent. This determination process can be executed by, for example, a computer. As described above, the article management system 1 according to the first exemplary embodiment can detect the presence or absence of the management target article 105 without needing to attach the RF tags 104 to the respective management target articles 105, and can manage the presence or absence of each management target article 105.

In the article management system 1 according to the first exemplary embodiment, in order to cause a change in the response of each RF tag 104 depending on the presence or absence of each management target article 105, it is only necessary that the first distance L1 between the RF tag 104 and the management target article 105 satisfy the relationship of L1≤λ, and it is not necessary for the management target article 105 to block the line of sight between the RF tag 104 and the reader antenna 102. That is, the location where the management target article 105 is arranged is not limited to the location between the tag antenna 112 of the RFID reader 103 and the RF tag 104, which leads to an increase in the degree of freedom of arrangement thereof. For example, in the case of detecting the presence or absence of articles on a store shelf, the reader antenna 102 and the RF tags 104 can be incorporated in the shelf board. In this case, the antenna is not visible from the outside, and thus is extremely excellent in appearance.

Although the system for detecting a change in the signal intensity due to a deviation of the resonance frequency of the tag antenna 112 from the radio communication frequency has been mainly described above, the present invention is not limited to this. If a deviation of the resonance frequency occurs, the presence or absence of the articles may be detected in such a manner that the reader sweeps the radio communication frequency within the legally permitted range and detects the deviation of the resonance frequency. A large phase change occurs before and after the resonance frequency. Therefore, needless to say, the presence or absence of the articles can also be detected by observing a phase change.

As with the above-mentioned first distance L1, if the line-of-sight distance L2 between the tag antenna 112 and the reader antenna 102 satisfies the relationship of L2≤λ, the reader antenna 102 and the tag antenna 112 fall within the near-field. The term "line-of-sight distance L2" herein used refers to a distance between the strip conductor 102a, which is an especially strong wave source in the reader antenna 102, and the tag antenna 112. When the line-of-sight distance L2 is set to be equal to or less than λ, the respective contributions of the quasi-static electromagnetic field and the induced electromagnetic field are sufficiently large, and thus the reader antenna 102 and the tag antenna 112 can be electromagnetically coupled together. Especially in the article management system 1 according to the first exemplary embodiment, the presence or absence of each article is determined based on an analog quantity, i.e., the strength of the reflected electromagnetic field transmitted from each RF tag 104. Accordingly, a change in the strength of the reflected electromagnetic field due to radio wave interference is likely to cause an erroneous detection. However, with the above-mentioned configuration, the article management system 1 according to the first exemplary embodiment can establish a radio communication between the reader antenna 102 and the tag antenna 112 based on direct waves, so that the radio wave interference due to the multipath phenomenon is less likely to occur. This prevents an erroneous detection. Further, the electromagnetic field formed by the antennas of the RFID reader 103 and each RF tag 104 includes not only the components of the radiative electromagnetic field, but also the components of the quasi-static electromagnetic field and the induced electromagnetic field. Accordingly, the electromagnetic components spread in various directions, unlike in the case where only the normal far-field induced electromagnetic field components exist. Therefore, the article management system 1 according to the first exemplary embodiment can increase the degree of freedom with which the reader antenna 102 and each RF tag 104 are positioned relative to each other.

In the article management system according to the first exemplary embodiment, the presence or absence of the articles is determined based on an analog quantity, such as a change in the strength or phase of the reflected electromagnetic field transmitted from each RF tag 104, or a change in the resonance frequency of the tag antenna 112. Accordingly, the radio wave interference associated with the ambient environment causes an erroneous detection. However, in the article management system 1 according to the first exemplary embodiment, if the relationship of L2≤λ is satisfied, the radio communication between the reader antenna 102 and the tag antenna 112 is based on direct waves, so that the radio wave interference due to the multipath phenomenon that reflects the ambient environment is less likely to occur. This prevents an erroneous detection. Particularly in the case of managing the presence or absence of articles on shelves, the shelves may be formed of metal, or refrigeration cases made of metal are used as the shelves in many cases. Even in such an environment, this system can be stably operated.

In the article management system 1 according to the first exemplary embodiment, when the line-of-sight distance L2 between the reader antenna 102 and the RF tag 104 satisfies the relationship of L2≤λ, the line-of-sight distance L2 is about 0.3 m or less in a UHF band, which is one of the frequencies in the RFID standards, and is about 0.12 m or less in a 2.4 GHz band. In addition, since the distance L1 between the management target article arrangement region 110 and the RF tag 104 satisfies the relationship of L1≤λ, the distance L1 is about 0.3 m or less in the UHF band, which is one of the frequencies in the RFID standards, and is about 0.12 m or less in the 2.4 GHz band. Accordingly, the interval between the reader antenna 102 and the management target article arrangement region 110 is the same order as that of the distance, and thus the interval is narrowed. Therefore, the use of the article management system 1 according to the first exemplary embodiment allows the interval between each management target article 105 and each RF tag 104 or the reader antenna 102 to be narrowed, thereby preventing an object or a person, which is different from each management target article 105, from entering into the space between them, and also preventing an erroneous detection.

Further, in the article management system 1 according to the first exemplary embodiment, assuming that a circular constant is represented by π, it is preferable that the first distance L1 satisfy the relationship of L1≤λ/2π. When each management target article 105 affects the frequency characteristics of the corresponding tag antenna 112, in the reactive near-field where the first distance L1 satisfies the relationship of $L1 \leq \lambda/2\pi$, the strength of the electromagnetic field formed by the tag antenna 112 is higher than that in the radiative near-field where the first distance L1 satisfies $L1 > \lambda/2\pi$. Further, the respective contributions of the quasi-static electromagnetic field and the induced electromagnetic field which remain in the vicinity of the antenna are relatively large, and the contribution of the radiative electromagnetic field decreases. Therefore, in the article management system 1 according to the first exemplary embodiment, the coupling between the management target article 105 and the tag antenna 112 is strengthened. This results in an increase in the effect of the presence or absence of the management target article 105 on the operating characteristics of the tag antenna 112. Consequently, in the article management system 1 according to the first exemplary embodiment, the reflected electromagnetic field transmitted from each RF tag 104 to the RFID reader 103 changes greatly, so that the article management system is insusceptible to a disturbance or noise and prevents an erroneous detection.

In the article management system 1 according to the first exemplary embodiment, it is preferable that the line-of-sight distance L2 satisfy the relationship of $L2 \leq \lambda/2\pi$. Thus, when the line-of-sight distance L2 satisfies the relationship of $L2 \leq \lambda/2\pi$, in the article management system 1 according to the first exemplary embodiment, the respective contributions of the quasi-static electromagnetic field and the induced electromagnetic field, which remain in the vicinity of the antenna, are relatively large as compared with the case where the line-of-sight distance L2 satisfies $L2 > \lambda/2\pi$, and the coupling between the reader antenna 102 and the tag antenna 112 becomes strengthened. Accordingly, in the article management system 1 according to the first exemplary embodiment, the communication between the RFID reader 103 and each RF tag 104 is insusceptible to a disturbance or noise. As a result, the article management system 1 according to the first exemplary embodiment can be realized as an article management system that is insusceptible to a disturbance or noise. Further, the electromagnetic components of the quasi-static electromagnetic field, the induced electromagnetic field, and the radiative electromagnetic field coexist at a sufficient strength, and the direction of each vector temporally changes in various ways. Therefore, the article management system 1 according to the first exemplary embodiment can increase the degree of freedom of relative directions of the reader antenna 102 and the tag antenna 112.

Further, in the article management system 1 according to the first exemplary embodiment, when the relationship of $L2 \leq \lambda/2\pi$ is satisfied, the line-of-sight distance between the reader antenna 102 and the RF tag 104 is about 0.05 m or less in the UHF band, which is one of the frequencies in the RFID standards, and is about 0.02 m or less in the 2.4 GHz band. Therefore, according to the article management system 1 of the first exemplary embodiment, an article management system that does not require a large space between the reader antenna 102 and each RF tag 104 can be achieved. For example, the reader antenna 102, the RF tags 104, and the articles to be managed can be placed on store shelves. Further, a reduction in the interval between the reader antenna 102 and each RF tag 104 prevents a person or an object from entering into the space between them, and also prevents an erroneous detection due to blocking of the line of sight.

On the other hand, as is generally well known, when the RF tags are attached to the respective articles on store shelves to manage the articles, the location where each RF tag is attached changes depending on the article to which the tag is attached. Accordingly, it is not preferable to satisfy the relationship of $L2 \leq \lambda/2\pi$, because the types of articles are limited and the respective locations where each RF tag is attached are limited. For this reason, in the case of attaching the RF tags to the respective management target articles to manage the articles, it is necessary to use an antenna that uses a radiative electromagnetic field capable of communication in the region including the far-field region so that each RF tag and the reader antenna can communicate with each other even when they are slightly spaced apart. Therefore, it is not suitable to use the open-type transmission line that is basically used for transmitting electromagnetic waves in the longitudinal direction of the line while suppressing the radiation of electromagnetic waves, and instead a generally used resonance antenna or leaky coaxial cable is used. However, if a reader antenna that generates a radiative electromagnetic field highly efficiently is used, the strength of the radiative electromagnetic field is attenuated only by 1/r with respect to the distance, resulting in an increase in the reading region. This causes failures in the management of articles, such as an erroneous reading of RF tags attached to articles on another adjacent shelf.

However, in the article management system 1 according to the first exemplary embodiment, the RF tags 104 are not attached to the respective articles. This facilitates the process in which the reader antenna 102 is laid, for example, on the bottom surface of a store shelf; the RF tags 104 are arranged thereon, while adjusting the coupling coefficients and satisfying the relationship of $L2 \leq \lambda/2\pi$; and then articles to be managed are arranged thereon. Accordingly, the article management system 1 according to the first exemplary embodiment can use the open-type transmission line that is basically used for transmitting electromagnetic waves in the longitudinal direction of the line, while suppressing the radiation of electromagnetic waves. Thus, the reader antenna 102 that uses the quasi-static electromagnetic field, the strength of which is attenuated by $1/r^3$, and the radiative electromagnetic field, the strength of which is attenuated by $1/r^2$, as main electromagnetic components, while suppressing the radiation, the strength of which is attenuated only by 1/r, is used, thereby facilitating the limitation of the region in which the RF tags 104 are read by one reader antenna 102 to manage the articles, in the case of managing the presence or absence of the articles on a store shelf. In addition, problems such as an erroneous reading of RF tags 104 on another adjacent shelf are less likely to occur. The management of articles on a store shelf has been described above by way of example. However, also in the case of managing articles placed on other types of shelves, or on a floor, the region in which the RF tags 104 are read by one reader antenna 102 and the region in which the articles are managed can be easily limited, as a matter of course.

In the article management system 1 according to the first exemplary embodiment, it is preferable that the first distance L1 and the second distance L2 satisfy the relationship of $L2 > L1$. The electromagnetic coupling is greatly dependent on the distances, while the strength of the electromagnetic coupling changes depending on the structure of each antenna or resonator and the characteristics of a medium between the antennas. In the article management system 1 according to the first exemplary embodiment, when $L2 > L1$ is satisfied, the coupling coefficient k2 between the tag antenna 112 and the management target article arrangement region 110 in which the management target article 105 is arranged can be set to be greater than the coupling coefficient k1 between the reader antenna 102 and the tag antenna 112. In other words, when the relationship of L2>L1 is secured, a change in the reflected wave strength due to a change in the frequency characteristics of the tag antenna 112 depending on the presence or absence of the article is greater than a change in the reflected wave strength due to the maintenance of the communication between the tag antenna 112 and the reader antenna 102. That is, the article management system 1 according to the first exemplary embodiment can reliably detect the presence or absence of each management target article 105, thereby preventing an erroneous detection.

In the article management system 1 according to the first exemplary embodiment, it is preferable that the coupling coefficient k1 between the reader antenna 102 and the tag antenna 112 be set to a value equal to or greater than $10^{-5}$. The power receiving sensitivity that gives the operating limits of current UHF band RF tags is approximately −20 dBm, whereas the output of a UHFF band RFID reader of a high-output version is 30 dBm. Accordingly, if the coupling coefficient k1 is a value equal to or greater than $10^{-5}$, electric power that allows UHF band RF tags to operate can be supplied.

In the article management system 1 according to the first exemplary embodiment, it is preferable that the coupling coefficient k1 between the reader antenna 102 and the tag antenna 112 be set to a value equal to or smaller than $10^{-2}$. When the tag antenna 112 is regarded as a dipole resonator, the electromagnetic coupling between the reader antenna 102 (for example, an open-type transmission line) and the tag antenna 112 can be interpreted, in a circuit manner, as coupling between the open-type transmission line and the resonator. Accordingly, extremely high coupling coefficients greatly affect the operation of the open-type transmission line, which results in a significant effect, as a coupled resonator system, on the operation of other RF tags 104. The state in which a plurality of resonators are coupled in parallel to the open-type transmission line can be considered as a circuit of a band-rejection filter. In this case, when copper or aluminum is used at a room temperature as the tag antenna of the UHF band RF tag, the unloaded Q value is approximately 100 or less. Accordingly, if the coupling coefficient k1 that determines the fractional bandwidth is a value of $10^{-2}$ or less, coupling of the tag antenna has almost no effect on the operation of the open-type transmission line. Therefore, when the coupling coefficient k1 is set to a value equal to or less than $10^{-2}$, the effect of coupling of the tag antenna 112 on the open-type transmission line can be suppressed, and the mutual effect between the tag antenna 112 and the RFID reader 103 coupled in parallel to the open-type transmission line can also be suppressed.

In the article management system 1 according to the first exemplary embodiment, it is preferable that the coupling coefficient k1 between the reader antenna 102 and the tag antenna 112 and the coupling coefficient k2 between the management target article 105 and the tag antenna 112 when the management target article 105 is present in the management target article arrangement region 110 satisfy the relationship of k1<k2. According to the present invention, when the relationship of k1<k2 is satisfied, that is, when the coupling coefficient k2 between the management target article arrangement region 110 and the tag antenna 112 is set to be greater than the coupling coefficient k1 between the reader antenna 102 and the tag antenna 112, a change in the reflected signal intensity due to a change in the frequency characteristics of the tag antenna 112 depending on the presence or absence of the article is greater than a change in the reflected signal intensity due to the maintenance of the communication between the tag antenna 112 and the reader antenna 102. That is, the article management system 1 according to the first exemplary embodiment can reliably detect the presence or absence of each management target article 105, thereby preventing an erroneous detection.

While in the first exemplary embodiment, the relationship of the arrangement of the reader antenna 102, the RF tags 104, and the management target articles 105 has been described in detail, the relative positions and directions of these components are not limited to those illustrated in a specific example shown in FIG. 2.

As described above, the article management system 1 according to the first exemplary embodiment can manage the presence or absence of the management target articles, without needing to provide the RF tags on the respective management target articles. However, in the article management system in which the RF tags 104 are arranged on the reader antenna 102 described above, the management target articles cannot be identified. Accordingly, in an article management system 10 according to the first exemplary embodiment, an identification mark is provided on each management target article, thereby making it possible to identify the management target articles by using the configuration of the article management system 1. The article management system 10 according to the first exemplary embodiment that uses the identification mark will be described in detail below.

Figure 6:
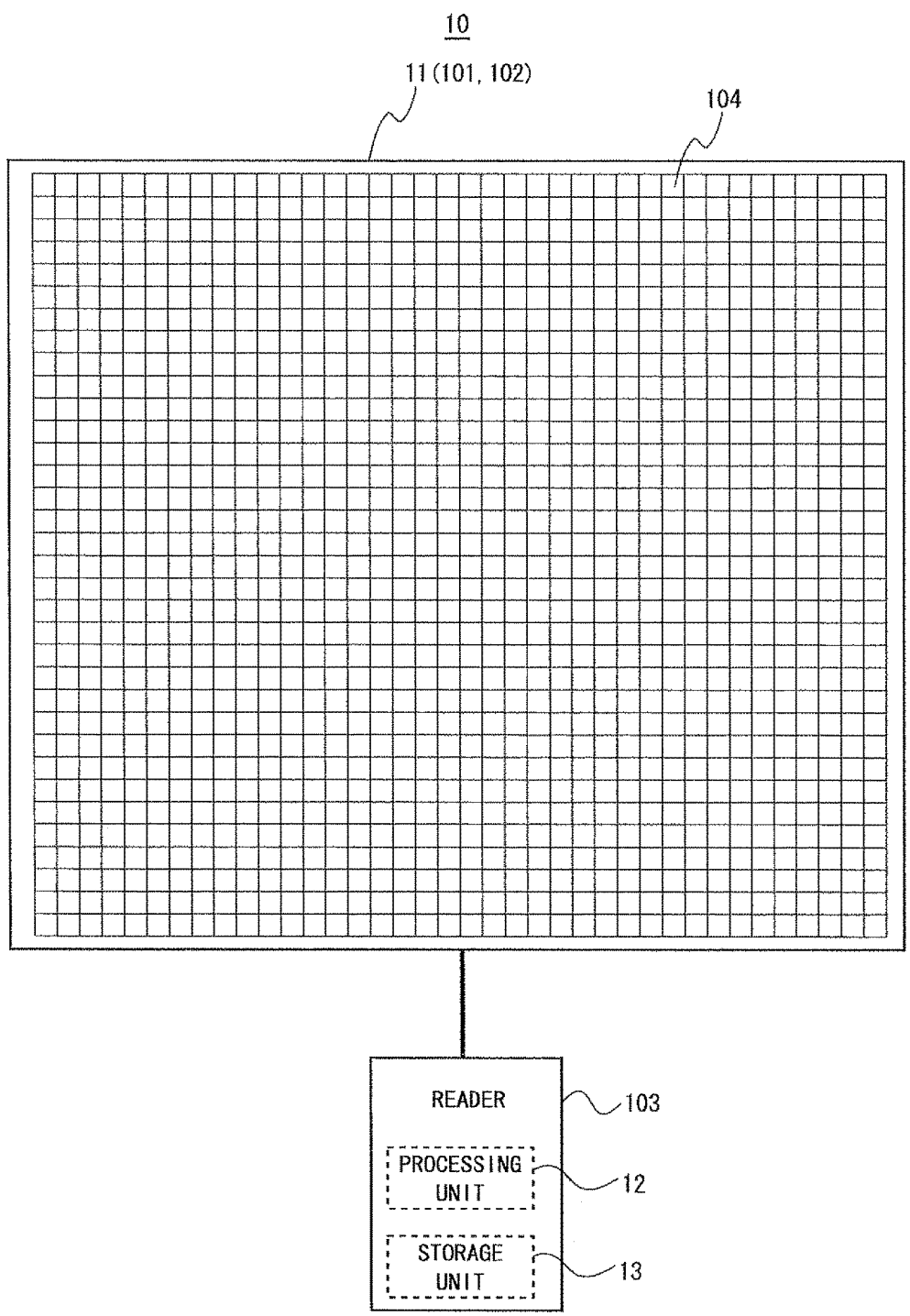
FIG. 6 is a schematic view of the article management system according to the first exemplary embodiment.

First, FIG. 6 shows a schematic view of the article management system 10 according to the first exemplary embodiment. As shown in FIG. 6, the article management system 10 according to the first exemplary embodiment includes the reader 103, a management shelf 11, and RF tags 104. Note that in FIG. 6, the illustration of an identification mark 20, which is used in the article management system 10 according to the first exemplary embodiment, and the illustration of the management target articles 105 each provided with the identification mark 20 are omitted.

The management shelf 11 includes the dielectric layer 101 and the reader antenna 102. In the article management system 10 according to the first exemplary embodiment, tag sheets each including the RF tag 104 are placed on the management shelf 11 (on the surface thereof on which the reader antenna 102a is arranged). These tag sheets are placed in a grid on the surface of the management shelf 11. The reader antenna 102a is connected to a lower part of each tag sheet.

The reader 103 includes, for example, a processing unit 12, which enables arithmetic processing, such as a computer, and a storage unit 13. The storage unit 13 stores a first table showing a correspondence relation between the location of each tag sheet and tag information of each RF tag, and a second table showing a correspondence relation between each management target article and an identification pattern formed on the identification mark as described later.

Figure 7:
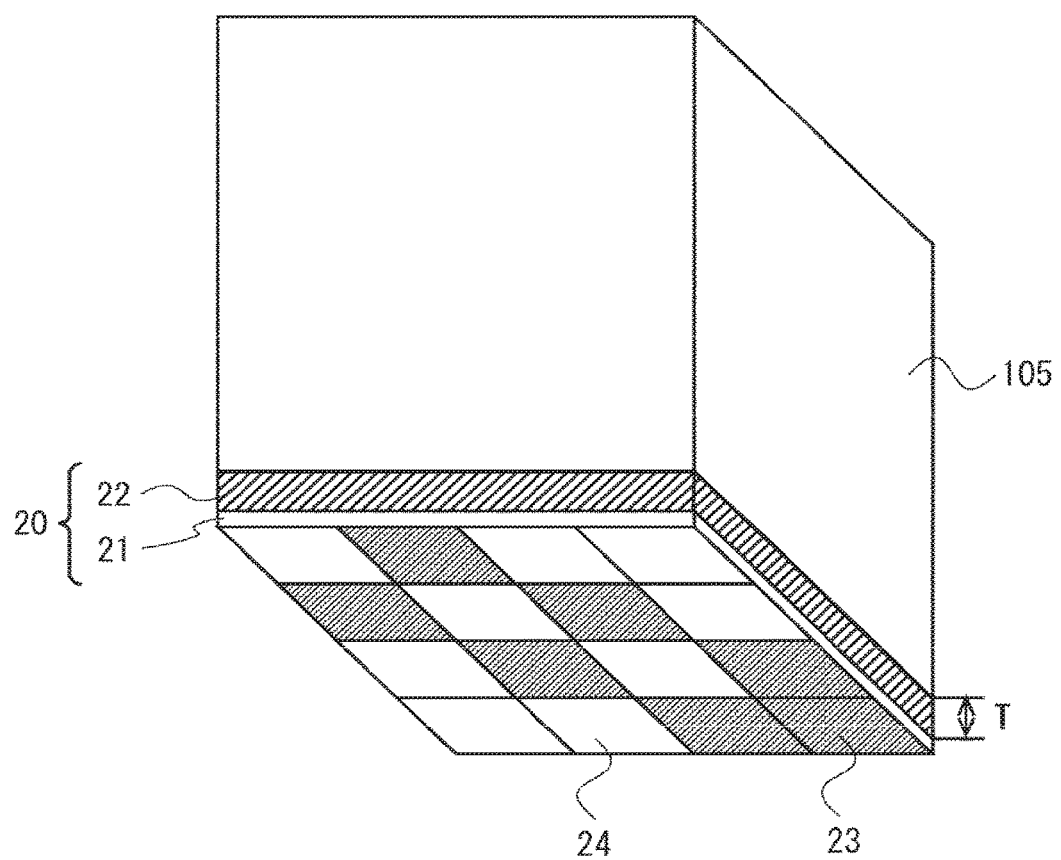
FIG. 7 is a schematic view for explaining an identification mark of the article management system according to the first exemplary embodiment.

Next, FIG. 7 shows a schematic view for explaining the identification mark 20 which is used in the article management system 10 according to the first exemplary embodiment. As shown in FIG. 7, the identification mark 20 is provided on the back surface (the surface facing the corresponding tag sheet) of the management target article 105. The identification mark 20 includes a pattern formation sheet 21 on which an identification pattern is formed, and a spacer 22 which is provided on a surface of the pattern formation sheet that is located on the side of the management target article.

In this case, the coupling coefficient between each RD tag 104 and each management target article 105 varies depending on the properties of the management target articles 105, such as the difference between the dielectric constants of the management target articles. Accordingly, a thickness T of the spacer 22 of the identification mark 20 is adjusted depending on the properties of the management target articles 105, thereby making it possible to prevent a malfunction of the article management system 10. For example, when the dielectric constant of the management target article 105 is high, the thickness T of the spacer 22 is preferably increased, and when the dielectric constant of the management target article 105 is low, the thickness T of the spacer 22 is preferably reduced.

As shown in FIG. 7, the identification pattern for identifying the identification mark is formed on the pattern formation sheet 21. The shape of this identification pattern is identified based on a first pattern 23 having a high dielectric constant and a second pattern 24 having a low dielectric constant, or based on the first pattern 23 having a high conductivity and the second pattern 24 having a low conductivity. Frames that are set in a grid are provided on the pattern formation sheet 21. One of the first pattern and the second pattern is formed in each frame on the pattern formation sheet 21. For example, a member having a high conductivity, such as metal foil, is suitably used for the first pattern, and a member having a low conductivity, such as plastic, is suitably used for the second pattern.

An adhesive member, such as double-sided tape or adhesive material, is preferably provided on the surface of the identification mark 20 that faces the management target article 105.

Figure 8:
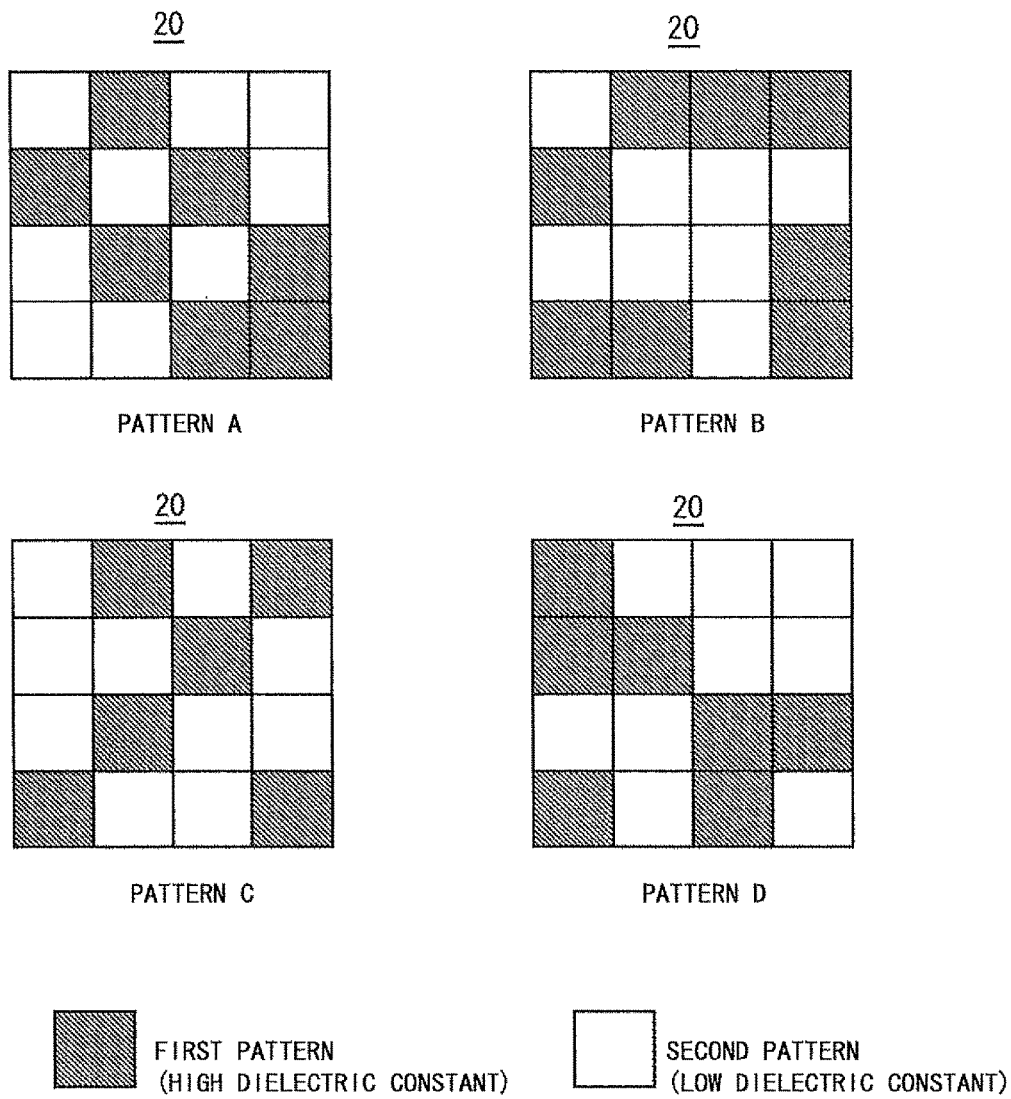
FIG. 8 is a diagram showing examples of an identification pattern of the identification mark according to the first exemplary embodiment.

In other words, each identification mark 20 has a different identification pattern. FIG. 8 shows examples of the identification pattern of the identification mark according to the first exemplary embodiment. FIG. 8 shows four examples of the identification pattern. As shown in FIG. 8, the identification pattern has a different shape for each identification mark 20. Each identification pattern according to the first exemplary embodiment is preferably varied even when the identification mark 20 is rotated.

Figure 9:
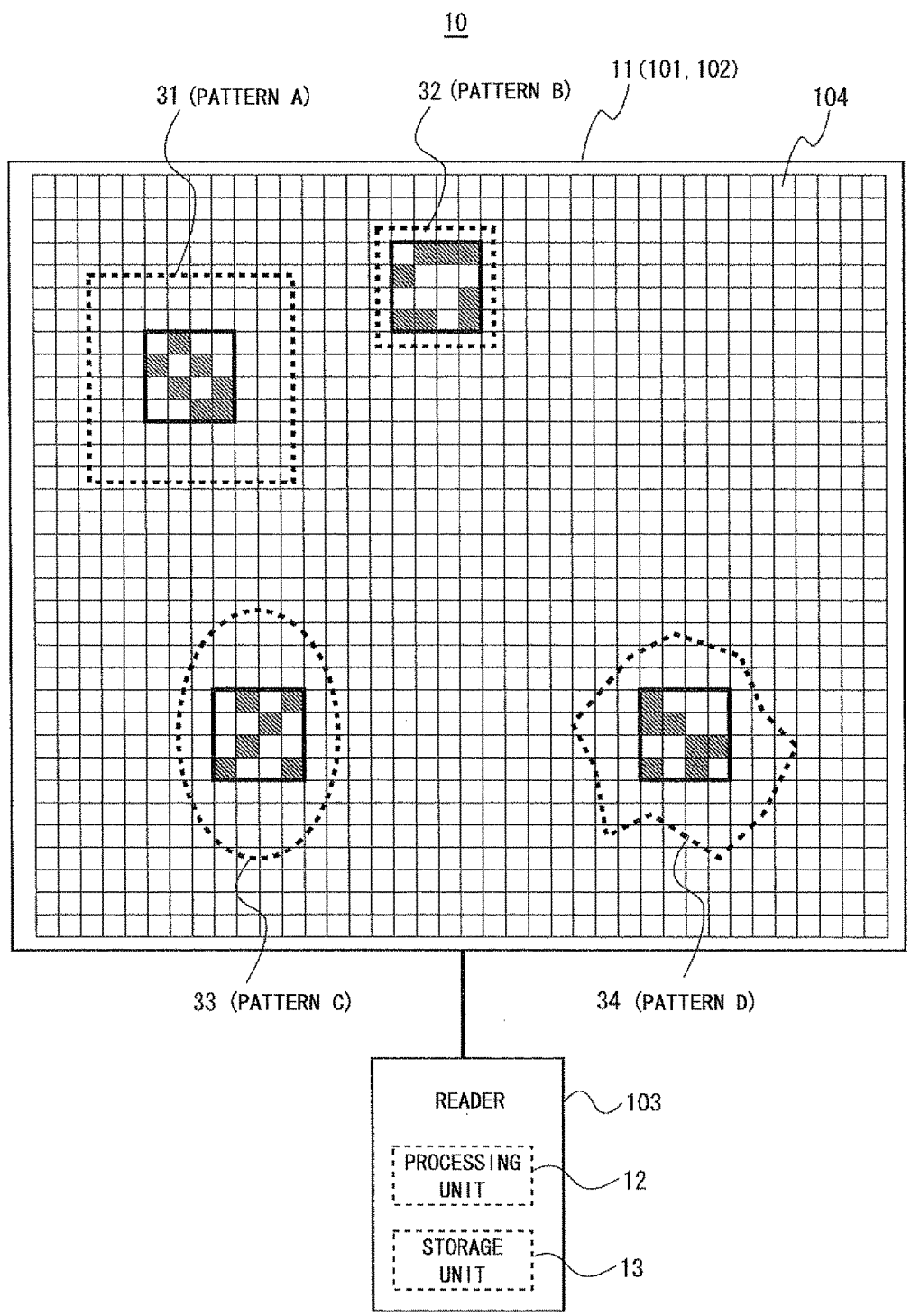
FIG. 9 is a schematic view showing a use state of the article management system according to the first exemplary embodiment.

Next, FIG. 9 is a schematic view showing a use state of the article management system 10 according to the first exemplary embodiment. In the example shown in FIG. 9, management target articles 31 to 34 are placed on the tag sheets. The management target article 31 is provided with the identification mark 20 having a pattern A shown in FIG. 8. The management target article 32 is provided with the identification mark 20 having a pattern B shown in FIG. 8. The management target article 33 is provided with the identification mark 20 having a pattern C shown in FIG. 8. The management target article 34 is provided with the identification mark 20 having a pattern D shown in FIG. 8.

In the article management system 10 according to the first exemplary embodiment, the RFID reader 103 reads the tag information of the RF tag 104 included in each tag sheet. In the RFID reader 103, the processing unit 12 identifies the identification pattern based on the read tag information. The processing unit 12 identifies the locations of the management target articles 31 to 34 and also identifies the management target articles with reference to the first table and the second table which are stored in the storage unit 13.

For example, when the identification pattern recognized based on the read tag information is the pattern A, the processing unit 12 can recognize that the management target article 31 is present at the location corresponding to the read tag information.

In the article management system 10 according to the first exemplary embodiment, when a member having a high dielectric constant or a high conductivity is located near the RF tag 104, the signal intensity of the response signal transmitted from the RF tag 104 is low. On the other hand, in the article management system 10 according to the first exemplary embodiment, when a member having a low dielectric constant or a low conductivity is located near the RF tag 104, the signal intensity of the response signal transmitted from the RF tag 104 is high. Accordingly, in the processing unit 12, each pattern formed of a white frame in the identification patterns shown in FIG. 8 is a pattern capable of identifying the tag information based on the response signal having a high signal intensity. In the pattern recognition processing by the processing unit 12, various pattern recognition processings in the field of, for example, image processing, can be applied.

As described above, in the article management system 10 according to the first exemplary embodiment, the management target articles are respectively provided with the identification marks 20 each having a different identification pattern, and the identification pattern is recognized based on the result of reading the tag information of the RF tags 104. Thus, in the article management system 10 according to the first exemplary embodiment, the management target article associated with the recognized identification pattern can be identified.

Unlike the RF tags 104, the identification mark 20 does not include any expensive member, such as a semiconductor chip. This prevents an increase in running cost due to the use of the identification mark 20. In addition, the identification pattern can be produced by an economical production method such as a printing technique.

Note that in the identification mark 20 described above, one identification pattern is associated with one identification mark. However, a plurality of identification marks may have the same identification pattern formed thereon, and the identification pattern may be used as an identification mark to indicate the type of the management target article.

Second Exemplary Embodiment

Figure 10:
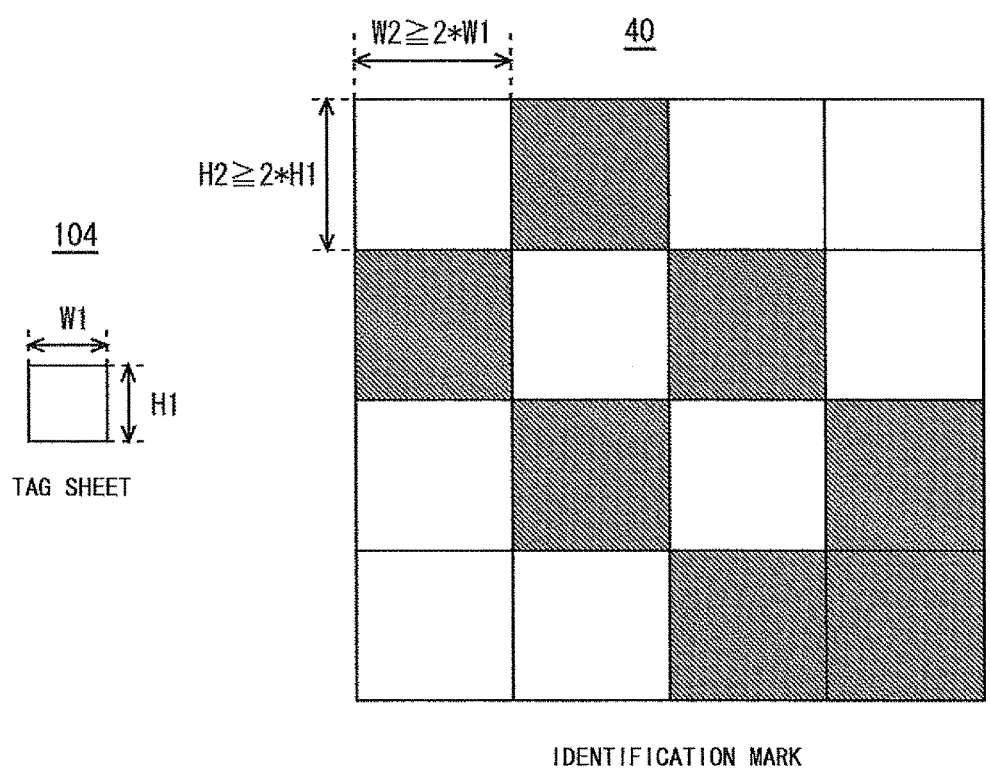
FIG. 10 is a diagram showing an example of an identification pattern of an identification mark according to a second exemplary embodiment.

In a second exemplary embodiment, another form of the identification pattern of the identification mark 20 will be described. FIG. 10 shows an example of an identification pattern of an identification mark 40 according to the second exemplary embodiment. As shown in FIG. 10, in the identification mark 40 according to the second exemplary embodiment, the size of each of the frames provided in a grid is set based on the size of each tag sheet.

Specifically, in the identification mark 40, a longitudinal width H2 of a frame is twice or more as large as a longitudinal width H1 of a tag sheet. Further, in the identification mark 40, a lateral width W2 of a frame is twice or more as large as a lateral width W1 of a tag sheet. Note that the longitudinal width H2 of a frame is preferably three times or more as large as the longitudinal width H1 of a tag sheet, and the lateral width W2 of a frame is preferably three times or more as large as the lateral width W1 of a tag sheet.

Figure 11:
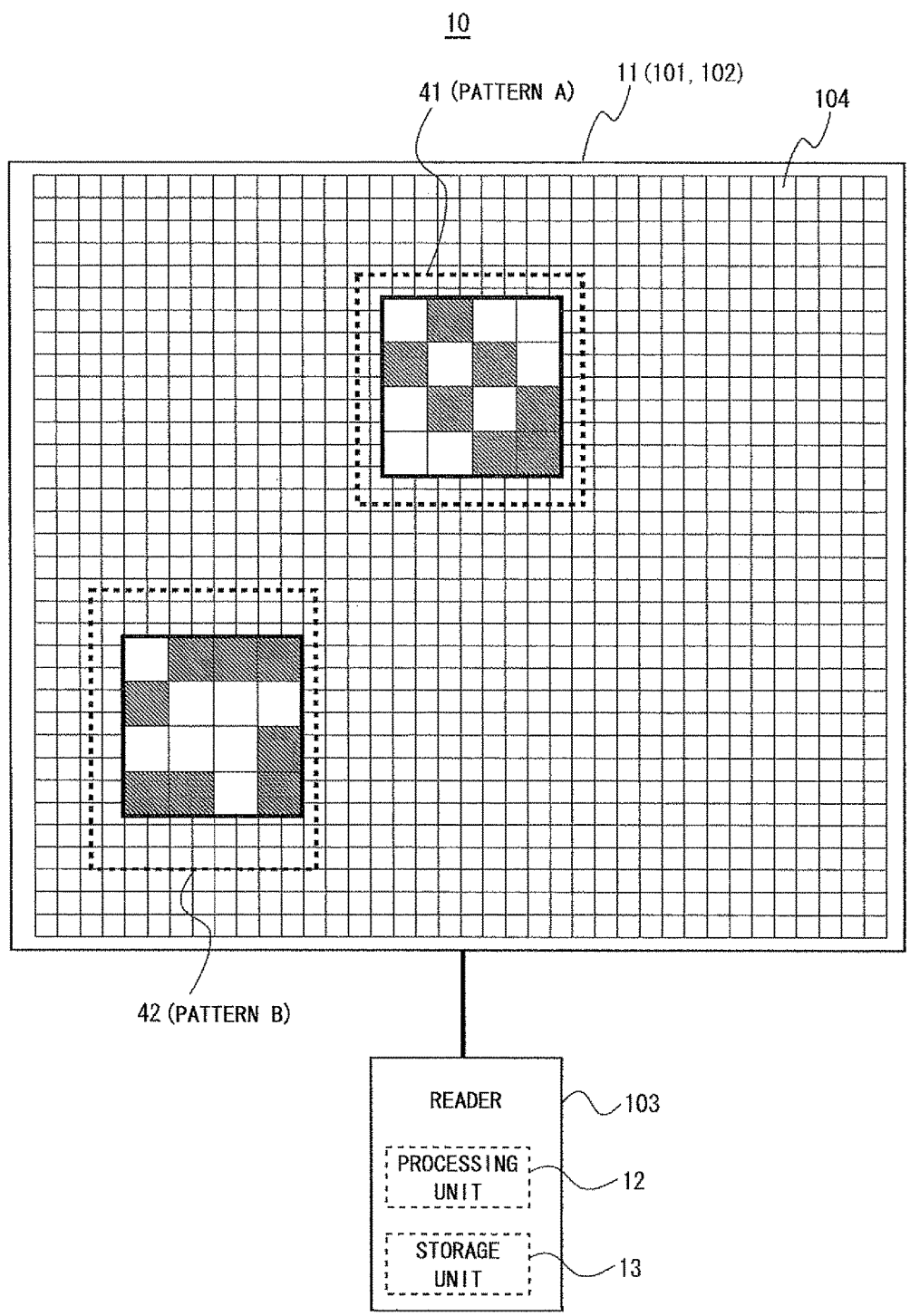
FIG. 11 is a schematic view showing a use state of an article management system according to the second exemplary embodiment.

Next, FIG. 11 is a schematic view showing a use state of the article management system using the identification mark 40 according to the second exemplary embodiment. In the example shown in FIG. 11, a management target article 41 which is provided with the identification mark 40 having the pattern A and a management target article 42 which is provided with the identification mark 40 having the pattern B are placed on the tag sheets.

As shown in FIG. 11, the use of the identification mark 40 makes it possible to increase the area in which tag sheets and one frame of the identification pattern overlap each other, even when the identification mark 40 is placed at a location deviating from the grid of the tag sheets. Assuming herein that the longitudinal width H2 of one frame of the identification pattern is three times or more as large as the longitudinal width H1 of a tag sheet and the lateral width W2 of one frame of the identification pattern is three times or more as large as the lateral width W1 of a tag sheet, at least one tag sheet is located below the frames of the identification pattern even if the identification mark 40 is placed at a location deviating from the grid of the tag sheets.

Accordingly, the use of the identification mark 40 makes it possible to secure a higher detection accuracy in the article management system 10 according to the second exemplary embodiment than in the article management system according to the first exemplary embodiment, regardless of the locations of the identification mark 40 and tag sheets.

Third Exemplary Embodiment

Figure 12:
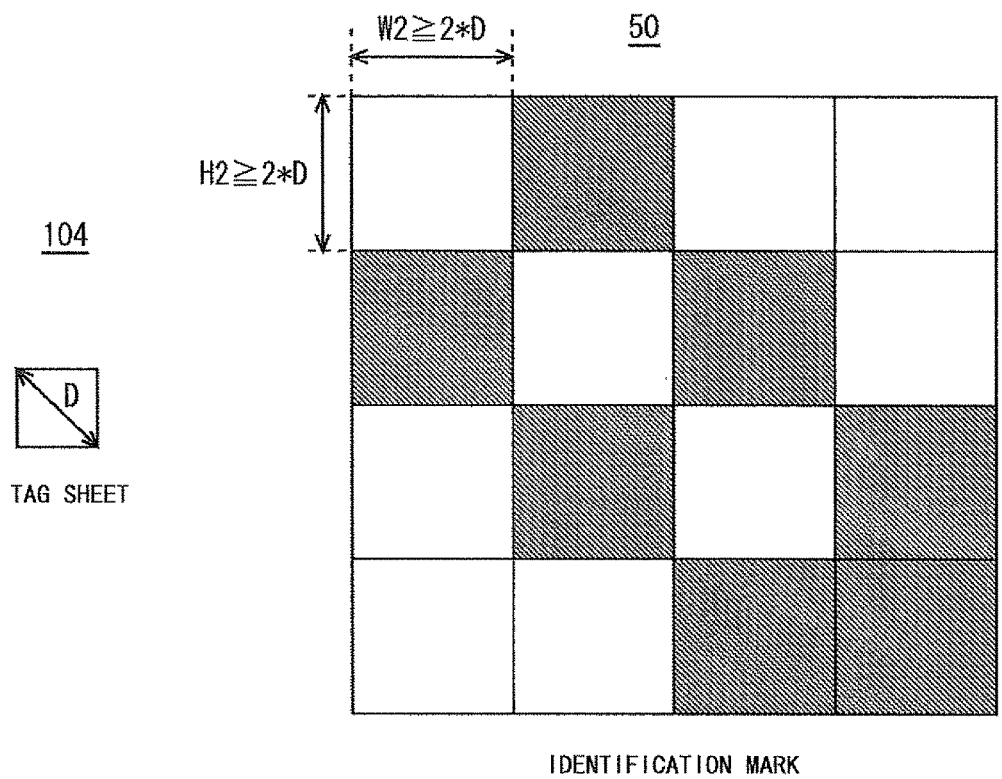
FIG. 12 is a diagram showing an example of an identification pattern of an identification mark according to a third exemplary embodiment.

In a third exemplary embodiment, still another form of the identification pattern of the identification mark 20 will be described. FIG. 12 shows an example of an identification pattern of an identification mark 50 according to the third exemplary embodiment. As shown in FIG. 12, in the identification mark 50 according to the third exemplary embodiment, the size of each of the frames provided in a grid is set based on the size of each tag sheet.

Specifically, in the identification mark 50, the longitudinal width H2 and the lateral width W2 of a frame are set to be twice or more as large as a length D of a diagonal line of a tag sheet. Note that the longitudinal width H2 and the lateral width W2 of a frame are preferably three times or more as large as the length D of the diagonal line of a tag sheet.

Figure 13:
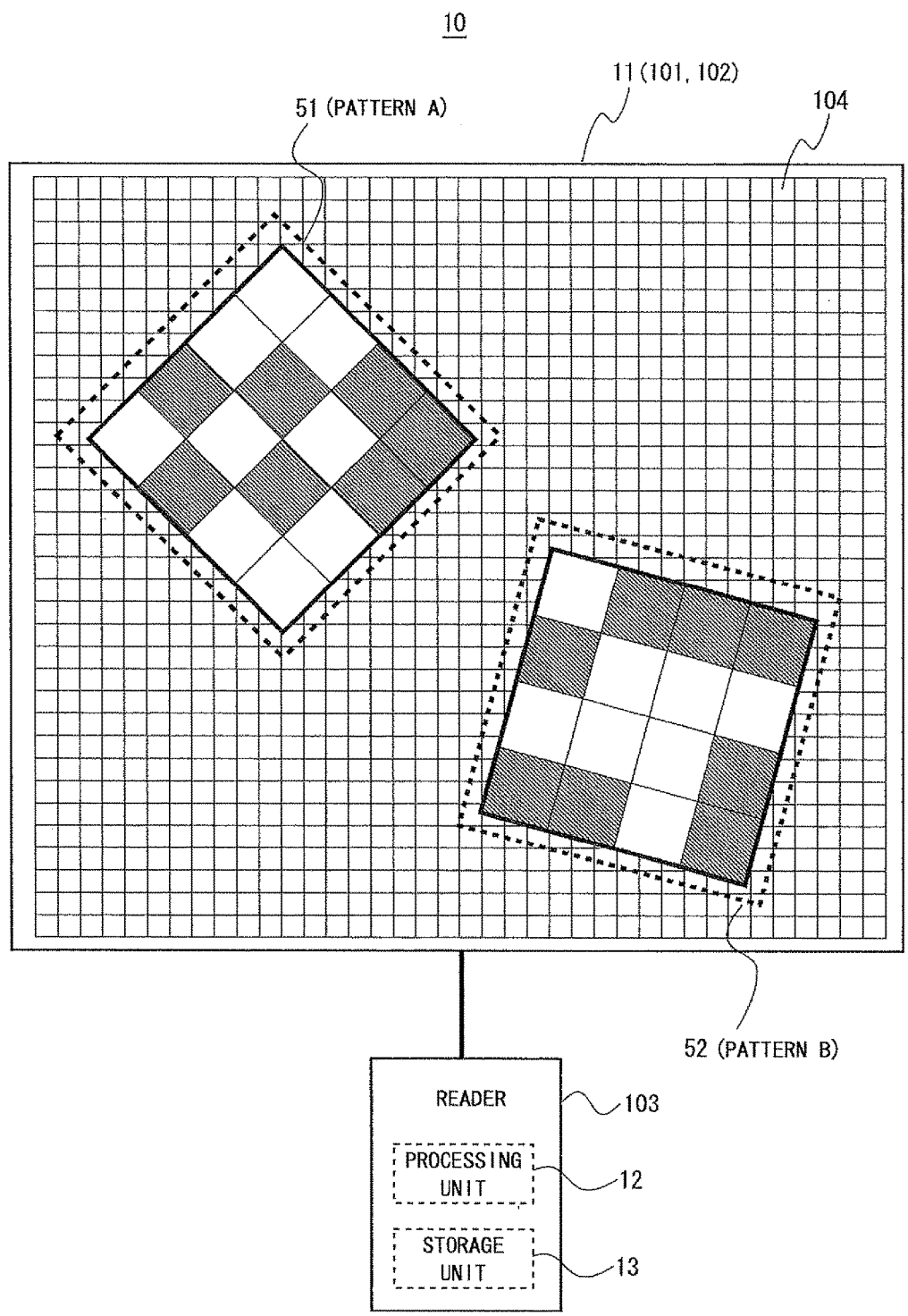
FIG. 13 is a schematic view showing a use state of an article management system according to the third exemplary embodiment.

Next, FIG. 13 is a schematic view showing a use state of the article management system using the identification mark 50 according to the third exemplary embodiment. In the example shown in FIG. 13, a management target article 51 which is provided with the identification mark 50 having the pattern A and a management target article 52 which is provided with the identification mark 50 having the pattern B are placed on the tag sheets.

As shown in FIG. 13, the use of the identification mark 50 makes it possible to increase the area in which tag sheets and one frame of the identification pattern overlap each other, even when the identification mark 50 is tilted with respect to the grid of the tag sheets. Assuming herein that the longitudinal width H2 and the lateral width W2 of one frame of the identification pattern are three times or more as large as the length D of the diagonal line of a tag sheet, at least one tag sheet is located below the frames of the identification pattern even if the identification mark 50 is tilted with respect to the grid of the tag sheets.

Accordingly, the use of the identification mark 50 makes it possible to secure a higher detection accuracy in the article management system 10 according to the third exemplary embodiment than in the article management system according to the first exemplary embodiment, even when the identification mark 50 is tilted with respect to the grid of the tag sheets.

Fourth Exemplary Embodiment

In a fourth exemplary embodiment, still one more form of the identification pattern of the identification mark 20 will be described. FIG. 14 shows an example of an identification pattern of an identification mark 60 according to the fourth exemplary embodiment. As shown in FIG. 14, in the identification mark 60 according to the fourth exemplary embodiment, the identification pattern includes a reservation pattern which is formed of a predetermined pattern. This reservation pattern is a part of another pattern and is formed at a predetermined location within the identification pattern.

The example shown in FIG. 14 illustrates a reservation pattern region RSV in which the reservation pattern is formed. In the example shown in FIG. 14, each of patterns E and F includes the reservation pattern region RSV that is set in a region located at a lower portion of the identification pattern in the figure. In the example shown in FIG. 14, each of patterns G and H includes the reservation pattern region RSV that is set in a region located at the lower right position of the identification pattern in the figure. In the example shown in FIG. 14, in each of patterns I and J, the entire identification pattern is the reservation pattern. In particular, in the patterns I and J, the shapes of bottoms of shoes are represented as patterns. The shapes of the reservation patterns represent the left foot pattern and the right foot pattern, respectively. Note that in FIG. 14, the first pattern forming the reservation pattern and the first pattern forming the normal identification pattern are represented by different shaded areas.

The reservation pattern is a pattern commonly used among a plurality of identification marks. In the RFID reader 103, the processing unit 12 recognizes the shape of the reservation pattern, thereby recognizing the range of the identification mark. Further, the RFID reader 103 recognizes the shape of the reservation pattern, thereby recognizing the direction of the identification mark and recognizing the direction of the management target article based on the recognized direction of the identification mark.

Figure 15:
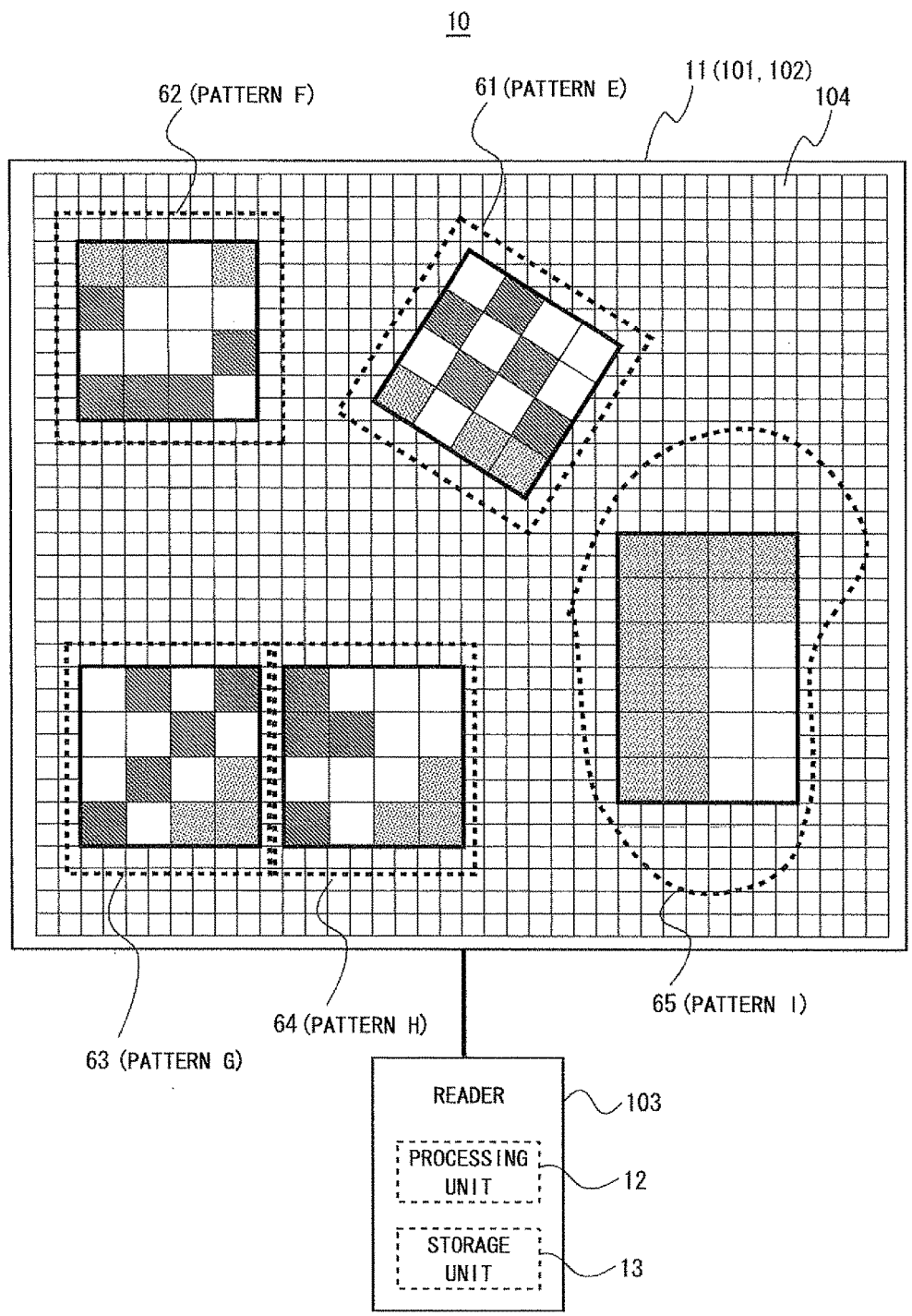
FIG. 15 is a schematic view showing a use state of an article management system according to the fourth exemplary embodiment.

In this regard, FIG. 15 is a schematic view showing a use state of the article management system 10 according to the fourth exemplary embodiment. In the example shown in FIG. 15, management target articles 61 to 65 are arranged on the tag sheets. The management target article 61 is provided with the identification mark 60 having the pattern E and is tilted to the left with respect to the grid of the tag sheets. The RFID reader 103 recognizes the tilt of the management target article 61 based on the tilt of the reservation pattern. The management target article 62 is provided with the identification mark 60 having the pattern F and is inverted from its normal position. The RFID reader 103 recognizes that the management target article 62 is inverted from its normal position based on the location of the reservation pattern. The management target articles 63 and 64 are arranged close to each other. In this case, the RFID reader 103 recognizes the range of the identification pattern based on the location of the reservation pattern, and determines the identification pattern for each recognized range. Thus, the RFID reader 103 recognizes that the management target articles 63 and 64 are arranged on the tag sheets. The management target article 65 includes the identification mark 60 having the pattern I. This pattern I is determined to be the left foot pattern. The RFID reader 103 recognizes the shape of the pattern I, thereby recognizing that the left foot, which faces upward in the figure, is present at the location of the management target article 65.

As described above, according to the article management system 10 of the fourth exemplary embodiment, the identification mark 60 includes the reservation pattern. Therefore, the article management system 10 according to the fourth exemplary embodiment is capable of not only identifying the management target articles and the locations of the management target articles, but also recognizing the tilt and direction of the management target articles. Furthermore, in the article management system 10 according to the fourth exemplary embodiment, erroneous recognition of the identification pattern can be prevented even when the identification marks 60 provided on the respective management target articles are adjacent to each other.

While the present invention has been described above with reference to exemplary embodiments, the present invention is not limited to the above exemplary embodiments. The configuration and details of the present invention can be modified in various manners that can be understood by those skilled in the art within the scope of the invention.

This application is based upon and claims the benefit of priority from Japanese patent application No. 2013-233221, filed on Nov. 11, 2013, the disclosure of which is incorporated herein in its entirety by reference.

REFERENCE SIGNS LIST 1, 10 ARTICLE MANAGEMENT SYSTEM
11 MANAGEMENT SHELF
12 PROCESSING UNIT
13 STORAGE UNIT
20 IDENTIFICATION MARK
21 PATTERN FORMATION SHEET
22 SPACER
23 FIRST PATTERN
24 SECOND PATTERN
31-34 MANAGEMENT TARGET ARTICLE
40 IDENTIFICATION MARK
41, 42 MANAGEMENT TARGET ARTICLE
50 IDENTIFICATION MARK
51, 52 MANAGEMENT TARGET ARTICLE
60 IDENTIFICATION MARK
61-65 MANAGEMENT TARGET ARTICLE
101 DIELECTRIC LAYER
102 READER ANTENNA
102a READER ANTENNA
102ag GROUND CONDUCTOR
102g GROUND CONDUCTOR
103 RFID READER
104 RF TAG
105 MANAGEMENT TARGET ARTICLE
110 MANAGEMENT TARGET ARTICLE ARRANGEMENT REGION
111 RFID CHIP
112 TAG ANTENNA
Rt MATCHED TERMINATION RESISTOR

The invention claimed is:

1. An article management system comprising:
a reader antenna that transmits and receives a radio signal;
a plurality of tag sheets each including an RF tag and placed on the reader antenna;
an RFID reader that reads tag information unique to the RF tag via the reader antenna; and
an identification mark attached to a management target article and arranged between the management target article and the tag sheets,
wherein on a surface of the identification mark that faces the tag sheets, an identification pattern for identifying the identification mark is formed of a first pattern and a second pattern, the second pattern having a dielectric constant or conductivity lower than that of the first pattern, and
wherein the RFID reader comprises:
a storage unit configured to store a first table showing a correspondence relation between a location of each of the tag sheets and the tag information of the RF tag, and a second table showing a correspondence relation between the identification pattern and the management target article; and
a processing unit configured to recognize the identification pattern based on the tag information read from tag sheets placed within a predetermined range among the plurality of tag sheets, and identifying a location of the management target article and identifying the management target article with reference to the first table and the second table.

2. The article management system according to claim 1, wherein the RF tag outputs a response signal including the tag information with a higher signal intensity when the RF tag approaches the second pattern of the identification mark, or when the identification mark is not present above the RF tag, than when the RF tag approaches the first pattern of the identification mark.

3. The article management system according to claim 1, wherein the identification mark comprises:
a pattern formation sheet on which the identification pattern is formed; and
a spacer provided on a surface of the pattern formation sheet that is located on a side of the management target article.

4. The article management system according to claim 1, wherein one of the first pattern and the second pattern is formed as the identification pattern in each of frames set in a grid in the identification mark.

5. The article management system according to claim 4, wherein
a longitudinal width of each of the frames is twice or more as large as a longitudinal width of each of the tag sheets, and
a lateral width of each of the frames is twice or more as large as a lateral width of each of the tag sheets.

6. The article management system according to claim 4, wherein a longitudinal width and a lateral width of each of the frames are twice or more as large as a length of a diagonal line of each of the tag sheets.

7. The article management system according to claim 1, wherein the identification pattern includes a reservation pattern in which a predetermined pattern is formed.

8. The article management system according to claim 7, wherein the reservation pattern is a part of the identification pattern and is formed at a predetermined location within the identification pattern.

9. An article management method for an article management system, the article management system comprising:
a reader antenna that transmits and receives a radio signal;
a plurality of tag sheets each including an RF tag and placed on the reader antenna; and
an RFID reader that reads tag information of the RF tag via the reader antenna,
wherein the RFID reader comprises:
a storage unit configured to store a first table showing a correspondence relation between a location of each of the tag sheets and the tag information of the RF tag, and a second table showing a correspondence relation between an identification pattern and a management target article; and
a processing unit configured to recognize the identification pattern based on the read tag information, and identifying a location of the management target article and identifying the management target article with reference to the first table and the second table, and wherein the article management method comprises:

recognizing, by the RFID reader, the identification pattern based on the tag information that can be read within a predetermined region and the tag information that cannot be read within the predetermined region; and identifying, by the RFID reader, the management target article based on the identification pattern, and identifying a location of the management target article.

10. The article management method according to claim 9, wherein the processing unit recognizes a predetermined reservation pattern in the recognized identification pattern, and recognizes a range of the identification pattern based on the reservation pattern.

11. The article management method according to claim 9, wherein the processing unit recognizes a direction of the management target article based on a direction of the reservation pattern.

12. The article management method according to claim 9, wherein the identification pattern is a pattern provided on the management target article and formed in an identification mark arranged between the management target article and the tag sheets, and the identification pattern is formed of a first pattern and a second pattern, the second pattern having a dielectric constant or conductivity lower than that of the first pattern.

13. The article management method according to claim 12, wherein the RF tag outputs a response signal including the tag information with a higher signal intensity when the RF tag approaches the second pattern of the identification mark, or when the identification mark is not present above the RF tag, than when the RF tag approaches the first pattern of the identification mark.

14. The article management method according to claim 12, wherein the identification mark comprises:

a pattern formation sheet on which the identification pattern is formed; and a spacer provided on a surface of the pattern formation sheet that is located on a side of the management target article.

15. The article management method according to claim 12, wherein one of the first pattern and the second pattern is formed as the identification pattern in each of frames set in a grid in the identification mark.

16. The article management method according to claim 15, wherein a longitudinal width of each of the frames is twice or more as large as a longitudinal width of each of the tag sheets, and a lateral width of each of the frames is twice or more as large as a lateral width of each of the tag sheets.

17. The article management method according to claim 15, wherein a longitudinal width and a lateral width of each of the frames are twice or more as large as a length of a diagonal line of each of the tag sheets.

18. An article management system comprising:

a reader antenna that transmits and receives a radio signal;

a plurality of tag sheets each including an RF tag and placed on the reader antenna; and an RFID reader that reads tag information unique to the RF tag via the reader antenna, wherein the RFID reader comprises:

a storage unit configured to store a first table showing a correspondence relation between a location of each of the tag sheets and the tag information of the RF tag, and a second table showing a correspondence relation between an identification pattern and a management target article; and a processing unit configured to recognize the identification pattern based on the read tag information, and identifying a location of the management target article and identifying the management target article with reference to the first table and the second table, and wherein the RFID reader identifies a location of the management target article and identifies the management target article based on a shape of the identification pattern recognized based on the tag information read from tag sheets placed within a predetermined range among the plurality of tag sheets.

\* \* \* \* \*